(12) United States Patent
Yang

(10) Patent No.: US 11,948,106 B1
(45) Date of Patent: Apr. 2, 2024

(54) SHIFT DESIGN AND ASSIGNMENT SYSTEM WITH FLEXIBLE MODELING OF CONSTRAINT AND COST FUNCTION

(71) Applicant: Workday, Inc., Pleasanton, CA (US)

(72) Inventor: Jin Yang, Castro Valley, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 16/725,853

(22) Filed: Dec. 23, 2019

(51) Int. Cl.
*G06Q 10/0631* (2023.01)
*G06F 17/11* (2006.01)
*G06Q 10/04* (2023.01)
*G06Q 10/1091* (2023.01)

(52) U.S. Cl.
CPC ...... *G06Q 10/063118* (2013.01); *G06F 17/11* (2013.01); *G06Q 10/04* (2013.01); *G06Q 10/063112* (2013.01); *G06Q 10/1091* (2013.01)

(58) Field of Classification Search
CPC .......... G06Q 17/11; G06Q 10/063118; G06Q 10/1091; G06Q 10/04; G06Q 10/063112; G06Q 10/0631; G06Q 10/06311; G06Q 10/063114; G06Q 10/06; G06Q 10/063116; G06Q 10/063115
USPC .............................................. 705/7.11–7.42
See application file for complete search history.

(56) References Cited

U.S. PATENT DOCUMENTS

| | | |
|---|---|---|
| 6,578,005 B1 | 6/2003 | Lesaint |
| 6,823,315 B1 | 11/2004 | Bucci |
| 6,889,196 B1 | 5/2005 | Clark |
| 7,062,449 B1 | 6/2006 | Clark |
| 9,395,707 B2 | 7/2016 | Anderson |
| 9,679,265 B1 | 6/2017 | Schwartz |
| 10,762,455 B1 | 9/2020 | Sager |
| 10,970,682 B1 * | 4/2021 | Aykin ...................... G06N 5/02 |
| 2004/0088234 A1 | 5/2004 | Kelly |
| 2004/0193472 A1 | 9/2004 | Ramakrishnan |

(Continued)

OTHER PUBLICATIONS

Santos et al., A Weighted Constraint Optimization Approach to the Nurse Scheduling Problem, 2015 IEEE 18th International Conference on Computational Science and Engineering, Oct. 1, 2015, pp. 233-239 (Year: 2015).*

(Continued)

*Primary Examiner* — Robert D Rines
(74) *Attorney, Agent, or Firm* — Van Pelt, Yi & James LLP

(57) ABSTRACT

A system includes one or more processors; and at least one non-transitory machine-readable storage media comprising instructions which, when executed by the one or more processors, cause the one or more processors to: generate a set of shift candidates based on labor demand data; determine a set of decision variables representing whether a particular shift candidate is selected in a final schedule and whether a particular worker is assigned to the particular shift candidate; determine a set of constraints based at least in part on the set of decision variables, the set of shift candidates, the labor demand data, and scheduling configuration data, wherein a constraint of the set of constraints is transformed into linear form in terms of the set of decision variables; and determine simultaneously, using a MIP solver, a subset of the shift candidates selected in the final schedule and a set of shift assignments of which worker is assigned to which selected shift candidate of the subset of the shift candidates.

21 Claims, 16 Drawing Sheets

(56) References Cited

U.S. PATENT DOCUMENTS

| | | | |
|---|---|---|---|
| 2005/0004828 A1* | 1/2005 | deSilva | G06Q 10/063112 |
| | | | 705/7.16 |
| 2005/0216328 A1 | 9/2005 | Clark | |
| 2007/0208604 A1* | 9/2007 | Purohit | G06Q 10/1095 |
| | | | 705/7.19 |
| 2008/0183538 A1 | 7/2008 | Hamadi | |
| 2008/0195982 A1* | 8/2008 | Nahir | G01R 31/318364 |
| | | | 716/106 |
| 2009/0094087 A1* | 4/2009 | Chung | G06Q 10/08 |
| | | | 705/7.11 |
| 2009/0132332 A1 | 5/2009 | Belenky | |
| 2009/0157689 A1 | 6/2009 | Hotz | |
| 2010/0299177 A1 | 11/2010 | Buczkowski | |
| 2011/0077994 A1* | 3/2011 | Segev | G06Q 10/06 |
| | | | 705/7.16 |
| 2011/0130857 A1 | 6/2011 | Budiman | |
| 2013/0073586 A1 | 3/2013 | Aubry | |
| 2014/0013252 A1 | 1/2014 | Ehrler | |
| 2014/0278649 A1 | 9/2014 | Guerinik | |
| 2014/0282586 A1 | 9/2014 | Shear | |
| 2014/0330605 A1* | 11/2014 | Connolly | G06Q 10/063116 |
| | | | 705/7.16 |
| 2017/0083873 A1 | 3/2017 | Syrichas | |
| 2018/0018614 A1* | 1/2018 | Vajracharya | G06Q 10/04 |
| 2018/0103116 A1 | 4/2018 | Raghunathan | |
| 2019/0087763 A1 | 3/2019 | Stone | |
| 2019/0227533 A1* | 7/2019 | Shih | G05B 19/41865 |
| 2020/0401985 A1* | 12/2020 | Agarwal | G06Q 10/04 |
| 2021/0383246 A1* | 12/2021 | Wee | G06N 5/01 |

OTHER PUBLICATIONS

Al-Yakoob (2007). Mixed-integer programming models for an employee scheduling problem with multiple shifts and work locations.

G.W. Klau, "Lagrangian Relaxation: An overview" Discrete Mathematics for Bioinformatics WS 07/08, 18. Dec. 2007, 14:21 1 (Year: 2007).

Kabak et al. "Efficient shift scheduling in the retail sector through two-stage optimization." European Journal of Operational Research 184.1 (2008): 76-90.

Nicholas Beaumont (Jan. 1997). Scheduling staff using mixed integer programming. Eur. J. of Op. Res. 98 (1997) 473-484 ("Beaumont").

Tran et al., "A novel Multiple Objective Symbiotic Organisms Search (MOSOS) for time-cost-labor utilization tradeoff problem" Knowledge-Based Systems, 2016—Elsevier (Year: 2016).

Bard et al., "Cyclic preference scheduling of nurses using a Lagrangian-based heuristic," Springer Science + Business Media, LLC 2007 (Year: 2007).

Floudas et al., "Mixed integer linear programming in process scheduling: Modeling, algorithms, and applications." Annals of Operations Research 139.1 (2005): 131-162. (Year: 2005).

Heimerl et al. Scheduling and staffing multiple projects with a multi-skilled workforce. OR Spectrum, 32(2), 343-368 (Year: 2010).

J. M. Arnaout. A robust reactive scheduling system with application to parallel machine scheduling (Order No. 3244860). Available from ProQuest Dissertations and Theses Professional. (304958122) (Year: 2006).

Ku et al., "Mixed Integer Programming models for job shop scheduling: A computational analysis," Computers & Operations Research, vol. 73, 2016, pp. 165-173, ISSN 0305-0548 (Year: 2016).

S. L. Janak. Scheduling of multiproduct and multipurpose batch plants: Modeling and algorithmic developments (Order No. 3247799). Available from ProQuest Dissertations and Theses Professional. (304838127) (Year: 2007).

Valouxis et al., "Hybrid optimization techniques for the workshift and rest assignment of nursing personnel," Artificial Intelligence in Medicine 20 (2000). (Year: 2000).

W. F. Yushimito-Del Valle. Mitigating peak congestion with staggered work hours: Effects, models, and Implications (Order No. 3514791). Available from ProQuest Dissertations and Theses Professional. (1022175469) (Year: 2011).

Zamorano et al., Task assignment with start time-dependent processing times for personnel at check-in counters. Journal of Scheduling, 21 (1), 93-109 (Year: 2018).

Millar et al., "Cyclic and non-cyclic scheduling of 12 h shift nurses by network programming," European Journal of Operational Research 104 (1998) 582-592. (Year: 1998).

\* cited by examiner

Employee Scheduling Data

Name: Bridget Jude

| Role | Skill Level | Pay |
|---|---|---|
| Cashier | Average | $15 / hr |
| Reception | High | $20 / hr |
| Server | Low | $15 / hr |

| | |
|---|---|
| Working Five Days A Week? | No |
| Two Consecutive Days Off? | No |
| Minimum Hours / Week | 20 |
| Maximum Hours / Week | 40 |
| Preferred Hours / Week | 35 |
| Available Days | Monday, Tuesday, Wednesday, Thursday, Friday, Saturday |
| Available Time | 7 AM - 6 PM |
| Preferred Days | Wednesday, Thursday, Friday |
| Preferred Time | 8 AM - 4 PM |

Labor Laws

| Category | Applicable Locale | Description |
|---|---|---|
| Meal Break | Colorado | 30 minutes unpaid meal break for every 5 hours consecutive work |
| Meal Break | Connecticut & Delaware | 30 minutes meal break after the first 2 hours and before the last 2 hours for employees who work 7.5 consecutive hours or more |
| Short Break | California | Paid 10 minutes rest period for each 4 hours worked |
| Daily Overtime | California, etc. | 1.5 times of the normal pay for the hours worked beyond 8 hours in a calendar day |
| Weekly Overtime | California, etc. | 1.5 times of the normal pay for the hours worked beyond 40 hours in a calendar week, except those hours already paid as daily overtime |
| Notification | City S | A worker should be given notification at least X hours in advance for any shift cancellation; otherwise the worker is entitled Y% of the total shift pay |

Union Contract

| Category | Applicable Scope | Description |
|---|---|---|
| Shift Length | All Workers | A shift should be between 4 and 11 hours |
| Min Hour | Part-time | A part-time worker working 3 or more days a week should be guaranteed at least 20 hours a week |
| Max Hour | All Workers | A worker should not be scheduled to work more than 45 hours in a calendar week |

FIG. 3B

Company Policy & Operation Conditions

| Category | Applicable Scope | Description |
|---|---|---|
| Rest Days | Full-time | 2 consecutive days of rest per week |
| Budget | Cashier at store X in week Y | No more than $15,000 |
| Organization Cycle | All Workers | Schedule pattern should repeat every 2 weeks |

FIG. 3C

Penalty Costs To Drive Schedule Quality

| Category | Description |
|---|---|
| Schedule Consistency | We are willing to pay 15% of the shift value for every shift difference for a worker comparing his/her typical week |
| Timing Preference | We are willing to pay 5% of the shift value for each violation of a worker's single time preference (can be either time of day or day of the week, or both) |
| Weekly Hour Preference | We are willing to pay 25% of the hourly rate for each hour deviate from a worker's preferred number of hours in a week |
| Job Role Preference | We are willing to pay 10% of the shift value for each shift assigned to a worker that is not his/her preferred role |
| Demand Coverage | We are willing to pay 150% of the average hourly rate for each hour of demand for cashier not covered when we relax the demand coverage constraint for cashier |

Cashier Labor Demand for 11/04/2019

| 9:00 AM | 10:00 AM | 11:00 AM | 12:00 PM | 1:00 PM | 2:00 PM | 3:00 PM | 4:00 PM |
|---------|----------|----------|----------|---------|---------|---------|---------|
| 2 | 3 | 4 | 4 | 4 | 4 | 4 | 3 |

FIG. 4

SHIFT DESIGN AND ASSIGNMENT SYSTEM WITH FLEXIBLE MODELING OF CONSTRAINT AND COST FUNCTION

BACKGROUND OF THE INVENTION

Scheduling workers to cover demand at a business is a challenging and inefficient process. A large number of constraints exist, including determining a set of shifts to satisfy the demand, assigning workers to the shifts while respecting workers' availabilities and qualification, avoiding costly overtime for a worker, observing the labor law, union contractual rules and company policies, accommodating workers' individual preferences as much as possible, etc. When this process is performed manually it consumes a great deal of time for the manager involved and it is almost impossible to consider the many objectives while ensuring the large number of constraints are not violated. Ideally an automated solution to this problem could be found, however, solving such a large multidimensional problem is very difficult.

The existing approaches either cannot model the complexity of the shift design and shift assignment problem and such miss the opportunity to produce high quality solution to obtain the economic benefits or need complex decision variables that represent the shift start/end time and as such are not able to solve a realistically sized problem and are also not able to express many relevant constraints or terms of the cost function easily. This leads to the inability to model many of the features in the workforce scheduling problem.

BRIEF DESCRIPTION OF THE DRAWINGS

Various embodiments of the invention are disclosed in the following detailed description and the accompanying drawings.

FIG. 3A is a diagram illustrating an embodiment of worker scheduling data.

FIG. 3B is a diagram illustrating an embodiment of labor law and union contract data.

FIG. 3C is a diagram illustrating an embodiment of company policy that impact the scheduling.

FIG. 3D is a diagram illustrating an embodiment of penalty cost configurations that are used to influence the schedule quality.

FIG. 4 is a diagram illustrating an embodiment of a labor demand specification.

DETAILED DESCRIPTION

Figure 1:
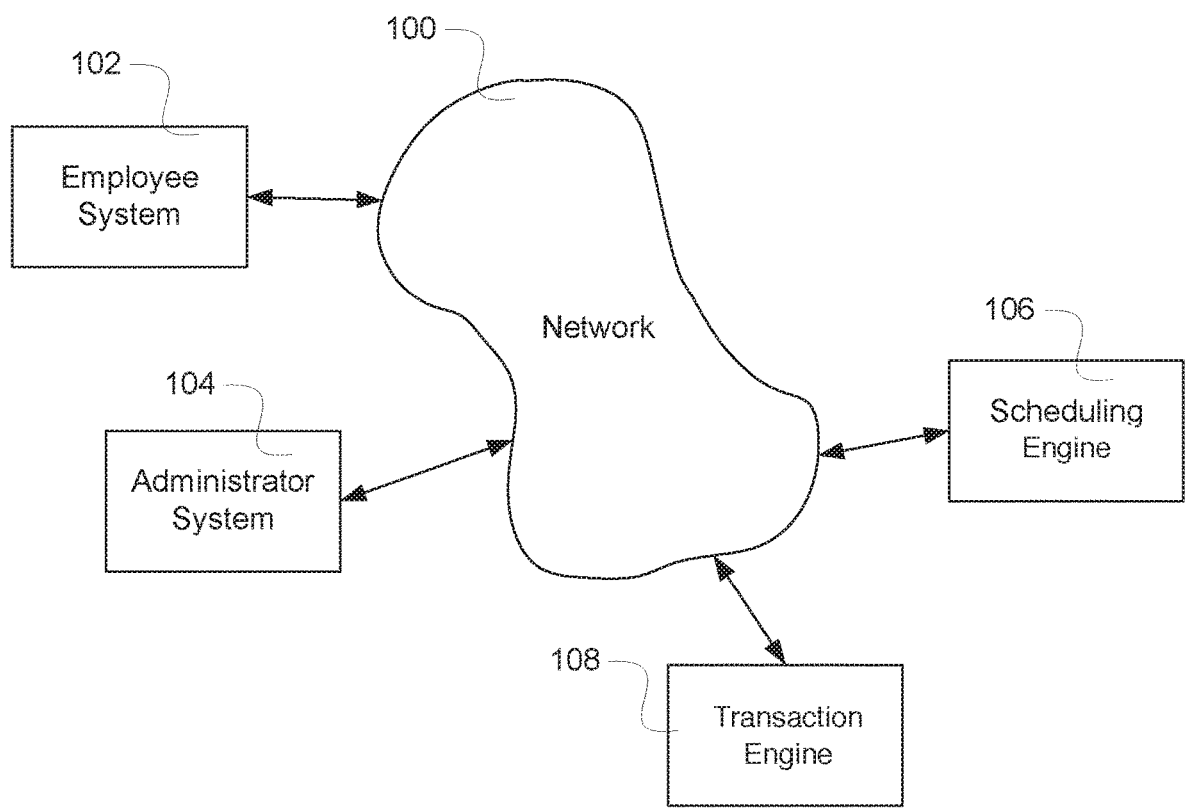
FIG. 1 is a block diagram illustrating an embodiment of a shift design and shift assignment system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for simultaneous shift design and shift assignment is disclosed. The system comprises an interface and a processor. The interface is configured to receive labor demand data, receive worker data, and receive scheduling configuration data. The processor is configured to: generate a set of shift candidates; determine a set of decision variables representing whether a particular shift candidate is selected in a final schedule and whether a particular worker is assigned to the particular shift candidate; determine a cost function, wherein the cost function is expressed at least in part in terms of the set of decision variables, a worker cost data of the worker data, and the scheduling configuration data; determine a set of constraints, wherein the set of constraints comprises hard constraints and soft constraints, wherein the set of constraints is based at least in part on terms of the set of decision variables, the set of shift candidates, the worker data, the labor demand data, and the scheduling configuration data, wherein a constraint of the set of constraints is transformed into linear form in terms of the set of decision variables; and determine simultaneously, using a MIP solver, a subset of the shift candidates selected in the final schedule and a set of shift assignments of which worker is assigned to which selected shift candidate of the subset of the shift candidates such that the hard constraints are fully respected, violations to the soft constraints are minimized, and the cost function is minimized.

This system uses a novel approach of pre-generating a set of shift candidates, far more than just a set that is just enough to cover the required labor demands. Then two main types of decision variables are used, one representing if a shift candidate is used in the final schedule and the other representing whether a particular worker is assigned to a particular shift candidate. Since the decision variables do not represent any shift start/end time, it is possible to transform input data such that any constraint or cost function can be expressed in a linear form in terms of the decision variables or in a form that can be converted into linear form. This leads to a system capable of solving a realistic size shift design and shift assignment problem by using a linear optimization solver such as a Mixed Integer Programming solver while allowing the flexibility of expressing complex business constraints and cost function. The system improves the computer by sometimes one or two orders of magnitude in speed in being able to simultaneously generate a shift design and shift assignment solution. Without this improvement in speed, the computer is not able to practically determine a shift design and shift assignment solution. With the disclosed system, the computer also is able to optimize simultaneous shift design and shift assignment to generate an optimized solution for both aspects of creating a schedule. Also, since the computation is much faster, power consumption and use of processor time are significantly reduced over the ordinary system.

A system for simultaneous shift design and shift assignment transforms input data to determine an appropriate optimization problem. The optimization problem is concerned about making a set of related decisions in such a way that a set of given constraints are satisfied and a utility function (called the objective function) is optimized (e.g., either minimized or maximized depending on the type of the objective function). Optimization solvers like a Boolean Satisfiability (SAT) solver, a Mathematical Programming (MP) solver, or a Mixed Integer Programming (MIP) solver can solve an optimization problem in the order of one million binary decision variables and one million constraints with readily accessible resources (e.g. single machine with multiple cores). In this case, a MIP solver is used. For the remainder of the description herein, a MIP solver is used, however, any other appropriate solver may be used. The optimization problem is determined by transforming the input data into a representation of three key elements: (1) a set of decision variables, such as $x_1, x_2, x_3, \ldots, x_n$, and the domain of values that they can take on (e.g., a binary variable can only on value of either 0 or 1), (2) a set of constraints expressed in terms of the decision variables and other known values (called parameter) of the given problem (e.g., a worker's hourly pay rate) in the form of a set of equalities or inequalities, for example, $f(x_1, x_2, x_3, \ldots, x_n) \geq 50$, and (3) an objective function expressed in terms of the decision variables and known parameters. Once the three elements are determined, a MIP solver can be used to solve the determined optimization problem. The solver can return one of the four answers: (1) an optimal solution is found and it gives the specific value each decision variable is taking at the optimum and the total value of the objective function at the optimum, (2) the problem is infeasible (no solution can be found, the set of constraints inherent conflicts), (3) the time is used up, returns the best near optimal solution so far, and (4) the given problem is an ill-formed problem (unbounded).

A system for shift design and shift assignment comprises an interface configured to receive the scheduling input data and a Scheduling Engine to determine the optimal schedule in terms of what shifts the final schedule should have and which worker is assigned to which shift. The scheduling input data includes labor demand data, worker data and scheduling configuration data. The labor demand data includes a worker's qualification, a number of workers needed, and a demand start time and a demand end time (i.e., what is needed, how many are needed and when). The worker data includes worker availability data, worker qualification data, worker cost data and worker personal preference data. The scheduling configuration data includes the relevant labor law (such as meal breaks, overtime pay, etc.), the relevant union contractual rules (such as minimum number of weekly hours, minimum and maximum shift length, etc.), company polices/business restrictions (such as weekly budget amount, delivery truck arrives every two weeks and such the business cycle is every two weeks, etc.), and the configuration data that drives the schedule quality (such as for every worker preference not respected in one shift X amount of penalty cost is incurred, etc.). The scheduling engine determines the optimal schedule by (1) generating a set of shift candidates based at least in part on the labor demand data wherein a shift candidate is one working shift for one worker with a specific start/end date/time and the qualification needed for the shift, (2) transforming input data to determine a set of decision variables that represent the decisions that are needed to determine a final schedule such as whether a shift candidate should be used in the final optimal schedule and whether one particular worker should be assigned to one particular shift candidate, (3) transforming input data to determine the total schedule cost including the labor cost of paying the workers and the penalty cost if the final schedule contains any undesirable characteristics (such as not respecting certain worker's preference, etc.) as a function of the decision variables (the objective function), (4) transforming input data to determine a set of constraints using the decision variables wherein the set of constraints is built based on a set of conditions/restrictions that are to be respected while determining the optimal schedule (e.g., the labor demands need to be met, worker's availability and qualification should be respected, two shifts assigned to one worker cannot overlap, the budget should be respected, etc.), and (5) invoking either a MIP solver by feeding in the decision variables, the constraints and the objective function to determine an optimal solution (if it exists) such that all decision variables are taking on appropriate values in such a way that all constraints are respected and the objective function is minimized (or maximized if the objective function represents profitability or something in that nature) or informing the user that no feasible solution can be found with the given information.

The labor demand for a given period is described by a set of demand specifications, comprising a start time, an end time, the qualification required, and a number of workers needed. For example, on Jul. 11, 2019, from 11:00 AM to 3:00 PM, three cashiers are needed. In some embodiments, a range is used for labor demand—for example, at least two but no more than four cashiers are needed. A shift candidate comprises a complete shift for a worker, typically the full working hours for a worker in a day. For example, a shift candidate comprises a start time, an end time, and a qualification (e.g., a cashier on Jul. 11, 2019 from 9:00 AM to 5:00 PM). A labor demand specification can require one or more shift candidates for complete coverage, and one shift candidate can cover at least portion of one demand specification up to multiple complete demand specifications. A demand specification is structured to describe the labor demand effectively. It can have any time duration and it represents one type of resource needed. A shift candidate represents one unit of work to be assigned to one worker. One shift candidate may also contain work for multiple qualifications. For example, a shift candidate comprises a shift on Jul. 11, 2019 from 8:00 AM to 4:00 PM, where the first four hours are as a cashier and the last four hours are as a sales associate. A shift requiring multiple qualifications can be useful in the event there are workers qualified for multiple jobs.

Worker data includes worker availability data (e.g., Tom is available on Monday/Tuesday/Wednesday any time, on Friday and Saturday from 1:00 pm to 10:00 pm, and he is taking vacation days from Nov. 4, 2019 to Nov. 7, 2019), worker qualification data (e.g., Tom can work as either a cashier or as a sales associate), worker cost data (e.g., Tom's hourly normal pay rate is $15), and personal preference data (e.g., Tom prefers shifts in hours from 1:00 pm to 6:00 pm and he prefers to obtain more hours as a sales associates rather than a cashier). In addition to demand data and worker data, other configuration data normally specified at the organizational level are also used when determining the optimal schedule. Those organizational level configuration data typically belong to one of the following four categories. Category One data are those used to describe the relevant labor laws that govern the meal breaks, short break, overtime pay, shift change notification time requirement and penalty cost etc. at a particular locale—for example, in Colorado a worker is given 30 minutes unpaid meal break if a work shift exceeds 5 consecutive hours. Category Two data are those used to describe the union contract—for example, certain part-time worker is guaranteed a minimum of 25 shift hours per week. Category Three data are those used to describe a company's policy or business operating conditions—for example, for this particular store the weekly labor budget is $25,000 or this particular store has business cycle of 2 weeks due to the arriving of delivery truck every two weeks. Category Four data are those data used to describe the trade-off decision that an organization is willing to make when determining the optimal schedule—for example, the company will not violate a worker's preferred time of the day in his/her shifts unless it can achieve more than $30 cost savings for each violation. These type of penalty costs are used by the solver at the time of invoking the optimization algorithm. They can largely influence the quality of the final optimal schedule.

After receiving all the input data, the first thing that the scheduling engine does is to generate a set of shift candidates using a heuristic primarily based on labor demand specification. For example, given two demand specifications such as on Nov. 4, 2019 from 9:00 am to 1:00 pm needing 1 cashier and on Nov. 4, 2019 from 1:00 pm to 5:00 pm needing 2 cashiers, the heuristics may generate the following 5 shift candidates: 2 identical shift candidates for a cashier going from 9:00 am to 5:00 pm on Nov. 4, 2019 (call it shift candidate type A), 1 shift candidate for a cashier going from 9:00 am to 1:00 pm on Nov. 4, 2019 (call it type B) and 2 identical shift candidates for a cashier going from 1:00 pm to 5:00 pm on Nov. 4, 2019 (call it type C). The heuristic should conform to the following restrictions: (1) it should generate sufficient shift candidates that provide the full coverage of the labor demands and normally only a subset of the shift candidates is needed in the final schedule to provide the full demand coverage (e.g., either 2 A or 1 B+2 C or 1 A+1 C in the above example); (2) it should generate shift candidates that conform to the relevant labor law, union contract and company policy that govern a single shift. In the rest of the steps of scheduling engine's processing, it will select the most effective subset of the shift candidates to use in the final schedule and to assign appropriate workers to staff the shifts in such as a way that all relevant constraints are respected and the objective function (of the total cost, including the penalty costs) is minimized.

A heuristic may be constructed that generates shift candidates that provide sufficient coverage for a given set of demand specification based on the following considerations: (1) Shift candidates are generated for one day at a time (and mostly for one resource type at a time). The amount of data the algorithm has to deal with is very limited (typically a few demand specifications at a time). In most cases, a full enumeration is possible as explained in FIG. 5 (see details in later section). (2) There are many restrictions from labor laws/union contract/company policy that govern the single shift. For example, shift duration has to be within the given minimum and maximum length. With those restrictions, the possible shift candidates that need to be created is reduced. (3) Common sense considerations can guide the direction to generate useful shift candidates for the solver to select from. For example, for the two demands in the previous illustration (1 cashier from 9:00 am to 1:00 pm and 2 cashiers from 1:00 pm to 5:00 pm), generating 2 shift candidates from 9:00 am to 5:00 pm for a cashier may make sense as it may be that only full-time workers are available to take on the shifts for the duration. Similarly, generating 1 shift candidate from 9:00 am to 1:00 pm and 2 shift candidates from 1:00 pm to 5:00 pm also makes sense since those three shift candidates would result the tightest demand coverage (without any waste of over coverage) if the three are selected. The final optimal solution also selects 1 shift candidate from 9:00 am to 5:00 pm and 1 shift candidate from 1:00 pm to 5:00 pm. At the time of generating the shift candidates, it is more relevant to choose possible candidates. It is the later optimization process that will decide which subset gets selected in order the get the optimal solution. In some embodiments, the heuristic generates shift candidates based on the availability of types of workers (e.g., only full time workers are available so only full time shifts are generated, only part time workers are available so only part time shifts are generated, etc.). In some embodiments, the heuristic generates shift candidates based on the practical consideration of not having workers take breaks all at once (e.g., by having staggered meal breaks in the set of shift candidates).

A generated shift candidate is subject to labor law legal constraints, union contract constraints, company policy constraints, etc. For example, a union contract can dictate that the duration of a shift has to be between four and nine hours, or a state law can require a half hour unpaid meal break for every 5 hours consecutive work. When a shift candidate that requires a meal break is generated, the exact timing of the meal break is placed on the shift. If alternative placements of the meal break are allowed by the law, each alternative is generated as an alternative shift candidate. The later optimization process will select the right one to use. For a shift candidate with a meal break, it will not provide coverage for the labor demand during the period of the meal break (typically 30 minutes). It is desirable to place the meal break at different time slot among different shift candidates with the same start/end time and the same resource type. This will allow the later optimization step better opportunity to provide more efficient demand coverage. Since the shift candidate is evaluated with regard to its conformance to the labor law or union contract one at a time, it is possible to determine a transformation of input data into a set of valid shift candidates no matter how complex the labor law may be. Therefore, for any set of legal or other external constraints on shift design, a set of shift candidates can be constructed wherein each shift candidate satisfies the constraints and covers at least part of the labor demand. By decoupling the process of generating individual shift candidates that conform to labor law/union contract/company policy from the optimization process of selecting which subset of the shift candidates to use in the final schedule and assigning workers to the selected shifts, arbitrary complexity can be handled in the labor law while not sacrificing efficiency of the final optimal schedule since the shift design decision (which shift to use) and shift assignment decision are made simultaneously.

The next step for the Scheduling Engine is to form the proper decision variables for the shift design and shift assignment problem at hand. The optimization algorithm provided by a MIP solver is the process of determining the proper values for the decision variables to take on in such a way that all relevant constraints are satisfied and the objective function is optimized (i.e., total schedule cost is minimized here). Two categories of decision variables are constructed that correspond to the two types decisions that are being made simultaneously, i.e., which subset of the shift candidates should be used in the final optimal schedule and which worker should be assigned to which shift. Let us assume that there are N number of workers available to work and M number of shift candidates have been generated for the given set of demands in a given scheduling period. For a worker i of the set of N workers and a shift candidate j of the set of M shift candidates, binary decision variable is defined as $y_j=1$ in the event that shift candidate j is selected in the final schedule and $y_j=0$ otherwise, and further the binary decision variable is defined as $x_{i,j}=1$ in the event that worker i is assigned to shift candidate j and $x_{i,j}=0$ otherwise. Thus the decision variables $x_{i,j}$ and $y_j$ together are able to describe what shape of the shifts that should be used to cover the labor demand (the shift design or shift selection) and which worker should work on which shift (the shift assignment). In some embodiments, additional decision variables can be introduced without changing the main structure of the approach that make this system unique. For example, if it is desired to guarantee that each worker should receive two consecutive days off each week in their schedule, decision variables can be introduced that represent whether the two days off for the worker are on Saturday/Sunday, or Sunday/Monday, or Monday/Tuesday, etc.

The shift candidate selection and shift assignment decision variables provide tremendous modeling power that almost any relevant concern of the workforce scheduling domain can be expressed as a simple linear expression of these decision variables. For example, demand coverage, shift non-overlap, min/max weekly hour, weekly budget, schedule consistency, etc. in our model can be easily expressed. This will enable the scheduling engine to cover far more number of features than all known existing approaches.

With the decision variables defined, all relevant constraints in the shift design and shift assignment problem can be determined in the form of a set equalities or inequalities in terms of the decision variables $x_{i,j}$ and $y_j$ and the input data. For example, to ensure that a worker is only assigned to a shift for which he is qualified, the following constraint can be added to the solver: $x_{i,j}=0$ in the event worker i does not have the qualification needed for shift candidate j. To respect worker's availability, the following constraint can be added to the solver: $x_{i,j}=0$ in the event the entire duration of shift candidate j is not fully contained in at least one of the available time segments of worker i. To ensure that a worker i is not assigned to work in both shift j and shift k that overlap, the following constraint can be added to the solver: $x_{i,j}+x_{i,k} \leq 1$.

A very wide range of business constraints and logical constraints in the domain of Workforce Scheduling (the problem that shift design and shift assignment addresses) can be determined using the decision variables generated based in the input data. Some constraint examples are: demand coverage constraints (e.g., the set of labor demand is satisfied by a set of shift candidates selected to be used in the final schedule), worker availability constraints (e.g., a worker is only assigned to work on shifts that she/he has time available), shift overlap constraints (e.g., a worker can only work one shift at a time), worker rest constraints (e.g., between two non-overlapping shifts assigned to one worker there should be a minimum amount of rest time to prevent the close/open situation in certain industries, i.e., an employee is assigned to a shift to close the store very late in a day and another shift to open the store very early the next morning), qualified worker constraints (e.g., a worker is only assigned to shift types that they are qualified for), minimum and maximum weekly hours constraints (e.g., a worker is guaranteed to be assigned to at least a minimum number of hours and no more than a maximum number of hours per week), weekly budget constraints (e.g., the total salary paid to workers per week cannot exceed a budget limit), working five days a week constraints (e.g., full time workers should be assigned to work exactly five days a week), two consecutive days off constraints (e.g., some workers are guaranteed to have two consecutive days off every week), and any other appropriate constraints.

Within the set of solutions that satisfy all constraints, an optimal or near-optimal solution is determined with respect to an objective function (e.g., by minimizing or maximizing the objective function). For example, a typical objective function represents the total cost of the schedule, wherein the total cost comprises the real cost of paying the workers for the schedule and a soft penalty cost that measures the desirability of the schedule along many dimensions. The real cost of the schedule comprises the sum of a base pay cost (e.g., a cost related to non-overtime and non-premium-time pay) and/or an overtime pay cost and other premium pay (e.g., shift hours at late night may be paid at higher than normal). The soft penalty cost comprises, for example, a schedule consistency cost (e.g., a cost associated with assigning a worker an inconsistent week to week schedule), a worker below average skill proficiency cost (e.g., a cost associated with assigning a below average skilled worker to a shift), a worker day and time preference violation cost (e.g., a cost associated with assigning an employee to a shift outside of his/her days of the week or time of the day preferences), a worker weekly scheduled time preference violation cost (e.g., a cost associated with assigning a worker to a weekly scheduled time below or above of his/her weekly scheduled time preferences), a worker job role preference violation cost (e.g., a cost associated with assigning a worker to a shift associated with job role outside of his/her preferred role when the worker is qualified for multiple roles), and/or any other appropriate costs. Each of the cost components can be expressed as a function of the decision variables and the input data.

With the decision variables defined, a set of constraints expressed in terms of the decision variables and an objective function (total cost) expressed in terms of the decision variable, the Scheduling Engine invokes a solver (a MIP solver) which determines the optimal value each decision variable should take on in such a way that all constraints are respected and the objective function is optimized (in this case the total cost is minimized). In the case that the solver does not find a solution for the given set of constraints, the Scheduling Engine will relax certain constraints and invoke the solver again with the relaxed problem. When the Scheduling Engine relaxes a constraint, it removes the constraint from the set of constraints sent to the solver and adds the amount of the constraint violation (expressed as a function of the decision variables) multiplied by a penalty cost factor to the objective function. For example, $\Sigma_j x_{i,j} (\beta_j - \alpha_j - b_j) \leq H_i$ is the maximum weekly hours constraint for worker i where $(\beta_j - \alpha_j - b_j)$ is the paid number of hours for shift candidate j and $H_i$ is the maximum weekly hours for worker i. To relax this constraint, in addition to removing it from the set of constraints, a term $c_i^H \max(0, \Sigma_j x_{i,j}(\beta_j - \alpha_j - b_j) - H_i)$ is added to the objective function of the total cost, where $c_i^H$ is the hourly penalty cost if the assigned total weekly shift hours is above the maximum weekly hours $H_i$ for worker i. When a constraint is relaxed, the solver will try to find a solution that respects the remaining constraints and at the same time minimizes the amount of the violation of the relaxed constraint due to the penalty cost term added to the objective function. A constraint that can be relaxed by the Scheduling Engine is called a soft constraint. The order in which the Scheduling Engine may relax varieties of soft constraints is configurable. For example, if it is more important to cover the labor demands than to conform to maximum weekly hours for a particular company, the maximum weekly hour constraints would be relaxed first before relaxing the labor demand coverage constraint. Most business constraints, such as budget constraints, demand coverage constraints, etc. can be treated as soft constraints. The Scheduling Engine will automatically relax them in a prescribed order if it cannot find a solution (e.g., as indicated using a prescribed order of relaxation list). Some constraints will never be relaxed and these are called hard constraints. For example, the constraint that guards against a worker getting assigned to two shifts that overlap will never be relaxed as the resulting solution may violate basic physics (e.g., a single person cannot be in two places at the same time).

Many real systems are inherently nonlinear, so it is important that optimization algorithms be able to handle nonlinearities. Realistically, however, nonlinear functions are very difficult to optimize for many reasons. For example, different starting points may lead to different solutions and many of the fast algorithms that are suitable for linear function cannot be directly applied. However, the disclosed system converts the nonlinear expression used in the objective function or the constraints to a linear expression by adding supplemental decision variables and supplemental linear constraints. This opens up a way for the system to use efficient linear solvers that are able to find an optimal solution many times faster and as such enable the system to solver much bigger scheduling problem. For example, the system often uses an expression such as max (0, x) in the objective function, which is nonlinear in nature. Let M be a positive value that is larger than absolute value of all possible x. By adding a binary variable u and the following set of linear constraints to the original optimization problem, the original expression max (0, x) can be replaced with a new replacement variable z, where $z \geq x$ $z \geq 0$ $z \leq x + Mu$ $z \leq M(1-u)$ The above constraints along with the fact that u is binary and M is big positive number guarantee z=max (0, x). This way, the system can apply a linear solver to the optimization problem. In some embodiments, the system is able to convert the complex accounting of the schedule cost into linear expressions without loss of precision. This enables the system to use a Mixed Integer Programming (MIP) solver to find an optimal or near optimal solution, which is far more efficient than a general-purpose SAT solver. This also allows the system to solve the problem incrementally far more efficiently by using the warm restart ability of the MIP solver.

FIG. 1 is a block diagram illustrating an embodiment of a system for shift design and shift assignment. In the example shown, FIG. 1 comprises network 100, employee system 102, administrator system 104, scheduling engine 106, and transaction engine 108 communicating with each other via network 100. In various embodiments, network 100 comprises one or more of the following: a local area network, a wide area network, a wired network, a wireless network, the Internet, an intranet, a storage area network, or any other appropriate communication network. Employee system 102 is a system for use by an employee. For example, employee system 102 comprises a desktop computer, a laptop computer, a tablet computer, a smartphone, etc. Employee system 102 interacts with the scheduling engine 106 to get schedule related questions for a worker answered or interacts with the transaction engine 108 to stores and/or to access data related to the worker's scheduling need. For example, an employee uses employee system 102 to provide employee preferences data, employee availability data, etc. to the transaction engine 108. An employee can also use employee system 102 to interact with scheduling engine 106 to answer questions such as "what is my schedule for next week?" or "can I swap this shift with others?", etc. Administrator system 104 is a system for use by an administrator or a manager. An administrator or a manager utilizes administrator system 104 to administrate and use a shift design and shift assignment system—for example, installing the applications, configuring the applications, managing the scheduling configuration data, to request schedule creation, to refine the schedule, to receive schedule data, etc. Depending on the nature of the interaction, administrator system 104 may communicate with (via the network 100) scheduling engine 106 or transaction engine 108, or both. Scheduling engine 106 manages the scheduling input data using the transaction engine 108 to persist data, generates a set of shift candidates based at least in part on the labor demand, creates an optimal schedule by invoking a MIP solver, and/or produces an incremental solution if a portion of the scheduling input data is changed. Scheduling engine 106 can read the scheduling input data from the transaction engine 108 and can also directly receive data from the employee system 102 or administrator system 104. Transaction engine 108 is responsible for storing and retrieving data from the persistence storage in such a way that it guarantees the transaction integrity during concurrent reads/writes by multiple users/agents/systems.

Figure 2:
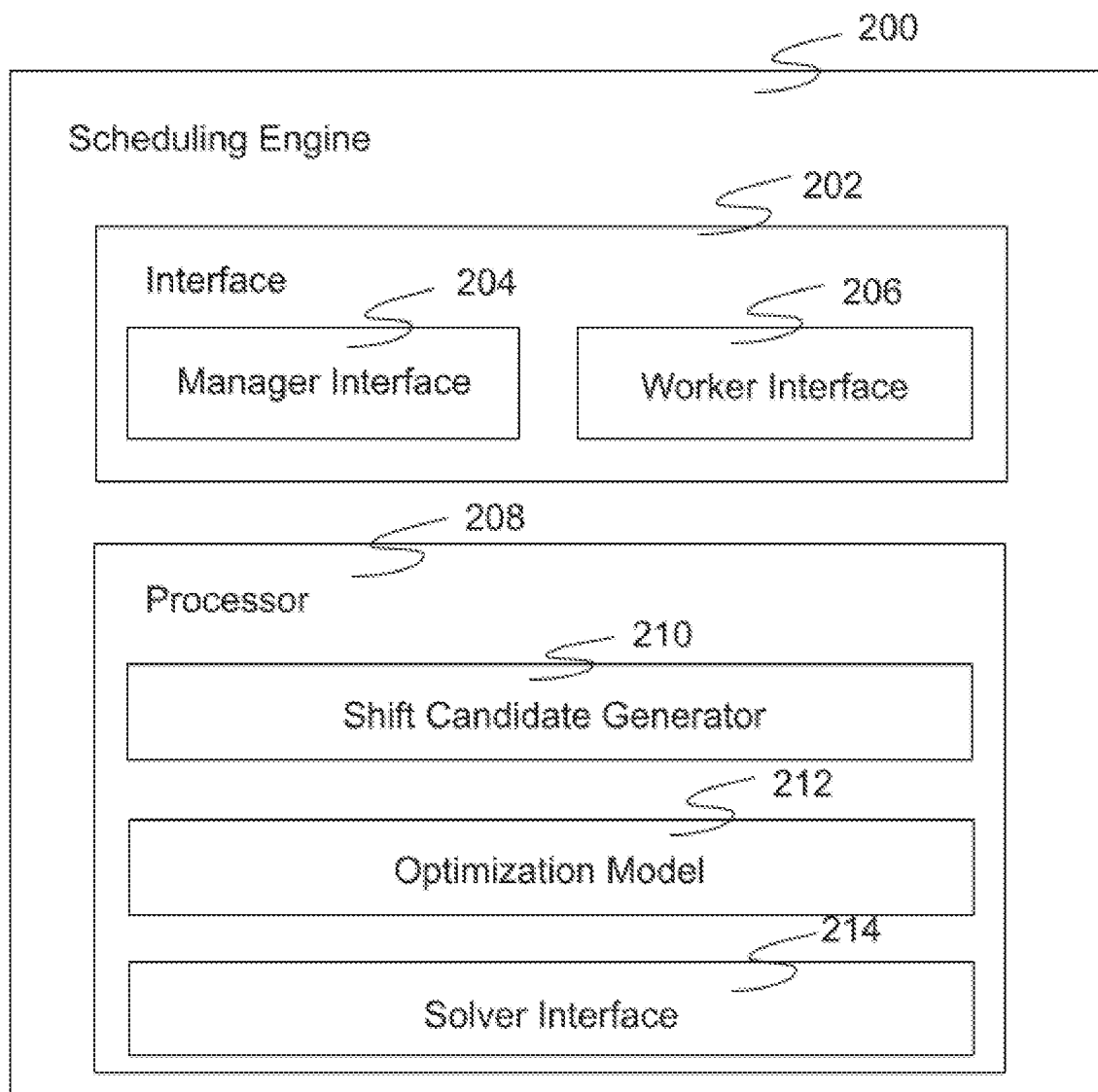
FIG. 2 is a block diagram illustrating an embodiment of a scheduling engine.

FIG. 2 is a block diagram illustrating an embodiment of a Scheduling Engine. In some embodiments, scheduling engine 200 of FIG. 2 comprises scheduling engine 106 of FIG. 1. In the example shown, scheduling engine 200 comprises an interface 202 and a processor 208. Interface 202 is responsible for communicating with external systems using a network and managing the scheduling input data. Interface 202 comprises manager interface 204 and worker interface 206 wherein manager interface 204 can deal with all input data and worker interface 206 deals with worker availability data, worker preference data and other worker specific data. Processor 208 is responsible for creating the optimal schedule for a given set of input data. Processor comprises shift candidate generator 210, optimization model 212 and solver interface 214. Primarily based on the labor demand data from interface 202 (e.g., as provided initially by a user using a user system), shift candidate generator 210 generates a set of shift candidates using a heuristic. The generated set of shift candidates from 210 along with other input data from 202 are passed to the optimization model 212 where a set of decision variables, a set of constraints and an objective function are constructed. In solver interface 214, a SAT or MP solver is invoked with the full optimization model (including decision variables, constraints and an objective function). An optimal solution will be obtained (if it exists). If no solution exists, some of the soft constraints will be relaxed and the solver is invoked again with the relaxed problem. The solution or indication of no solution is provided to the user using a user system via interface 202. In response to a solution being provided, the user is able to use the provided shift design and shift assignment (e.g., to provide to a worker that will work according to the schedule provided as a solution) and/or modify the shift design and shift assignment by adjusting the input data and resubmitting the input data for a new solution.

FIG. 3A is a diagram illustrating an embodiment of worker scheduling data. For example, the diagram of FIG. 3A comprises a summary of worker scheduling data or a user interface for entering worker scheduling data. In the example shown, worker scheduling data 300 comprises a worker name and a set of qualified worker roles, including worker skill level and pay rate for each role. Worker scheduling data 300 additionally comprises data to indicate working five days or not (e.g., whether the worker is guaranteed work exactly five days a week), two consecutive days off data (e.g., whether the worker is guaranteed consecutive two days off per week), minimum hours per week data, maximum hours per week data, preferred hours per week data, available days data, available times data, preferred days data, preferred times data, etc.

FIG. 3B is a diagram illustrating an embodiment of labor laws and union contract data. In the example shown, labor laws that govern meal break and short break in certain locales are listed in rows of a labor law table. Labor laws that govern overtime pay shift change notification rules, and penalty payment are also listed in rows of a labor law table. A union contract table is also shown, illustrating union rules associated with shift minimum/maximum length and min/max weekly hours. There can be many more types of labor laws and union contract rules. In some embodiments, labor laws and/or union contract rules relate to single shifts and the pay for workers under various conditions.

FIG. 3C is a diagram illustrating an embodiment of company policy and operation conditions that impact scheduling. In the example shown, a table includes rows describing company policy for rest days, a budget limit and an organization cycle (e.g., a schedule repeat pattern—for example, every two weeks). The table includes data that can impact what constraints should be enforced and how.

FIG. 3D is a diagram illustrating an embodiment of penalty cost configurations that are used to influence the schedule quality. In the example, shown, a table of rows describing penalty cost associated with schedule consistency, a worker's timing preference, a worker's total weekly hours preference, a worker's role preference and penalty cost for leaving demand uncovered. By varying the penalty costs, different shapes of the final schedule can be obtained from the solver.

FIG. 4 is a diagram illustrating an embodiment of a labor demand specification. In some embodiments, labor demand of FIG. 4 is input to the Scheduling Engine 106 of FIG. 1 as a labor demand. For example, labor demand 400 of FIG. 4 comprises the number of workers needed for the cashier role on a particular day in one hour increment for a scheduling organization. In the example shown, labor demand 400 comprises a number of required workers for a period of time. In some embodiments, labor demand 400 comprises a range of required workers for a period of time (e.g., a minimum number of required workers and a maximum number of required workers at each time). In the example shown, demand is shown from 9:00 AM until 5:00 PM in one hour increments. Two workers as cashier are required from 9:00 AM to 10:00 AM, 3 workers as cashier are required from 10:00 AM to 11:00 AM and from 4:00 PM to 5:00 PM, and 4 workers as cashiers are required from 11:00 AM to 12:00, 12:00 PM to 1:00 PM, 1:00 PM to 2:00 PM, 2:00 PM to 3:00 PM, and 3:00 PM to 4:00 PM.

Figure 5:
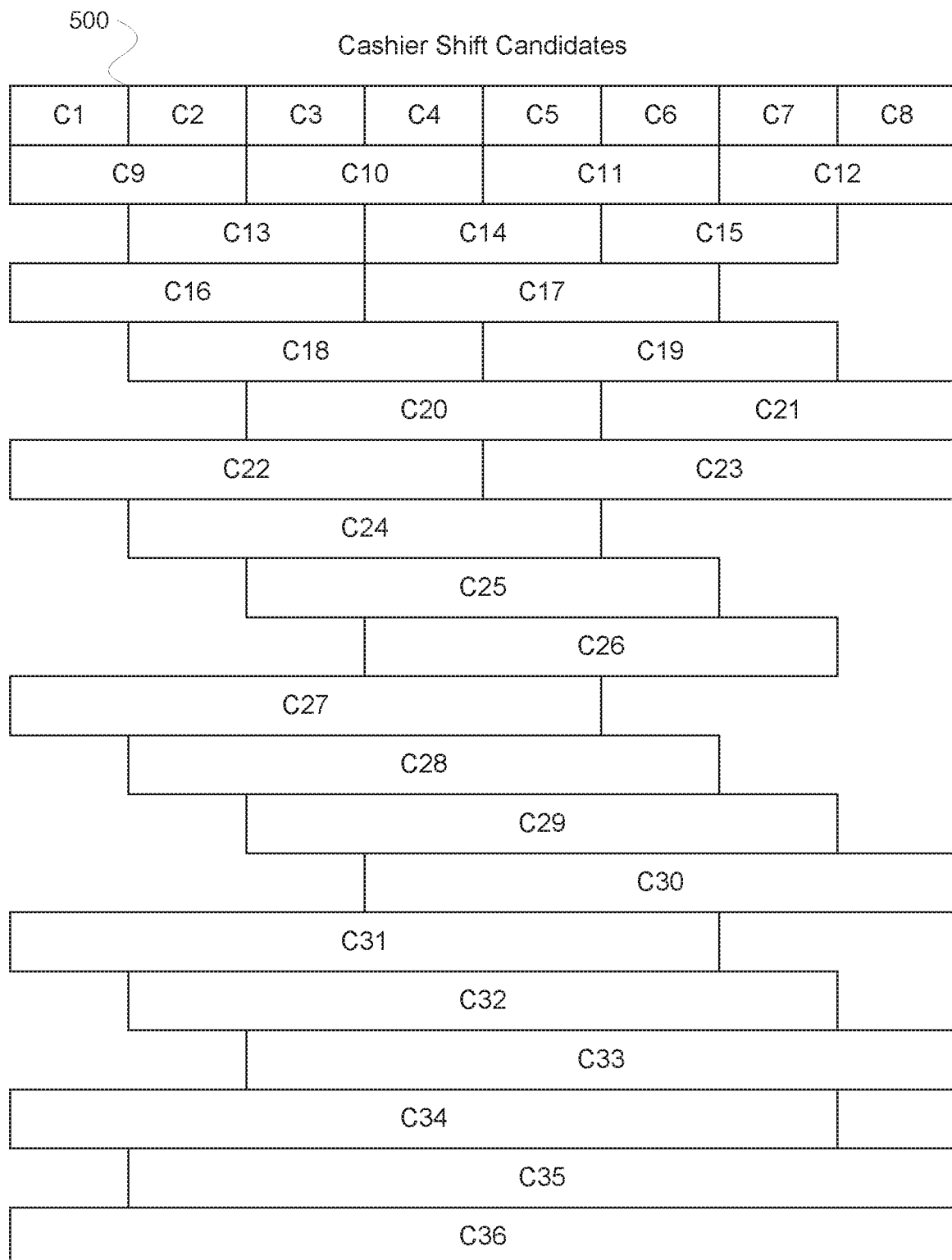
FIG. 5 is a diagram illustrating an embodiment of a set of shift candidates.

FIG. 5 is a diagram illustrating an embodiment of a set of shift candidates. In some embodiments, the set of shift candidates of FIG. 5 is generated by Shift Candidate Generator 210 of FIG. 2. In the example shown, the set of shift candidates 500 comprises a group of shift candidates generated from a heuristic (e.g., the full enumeration of all possible shifts starting from one hour long shifts up to eight hours long shifts with one hour increment). Each shift candidate of set of shift candidates 500 comprises a potential worker shift (e.g., where the shift is defined by a specific start/end time and has the required qualification for one worker to fill), from a minimum length shift (e.g., a 1 hour shift) to a maximum length shift (e.g., an 8 hour shift). For example, C1, C2, C3, C4, C5, C6, C7, and C8 comprise one hour long possible shift candidates starting at 9 AM, 10 AM, 11 AM, 12 PM, 1 PM, 2 PM, 3 PM, and 4 PM, respectively; C9, C13, C10, C14, C11, C15, and C12 comprise two hour long possible shift candidates starting at 9 AM, 10 AM, 11 AM, 12 PM, 1 PM, 2 PM, and 3 PM, respectively; C16, C18, C20, C17, C19, and C21 comprise three hour long possible shift candidates starting at 9 AM, 10 AM, 11 AM, 12 PM, 1 PM, and 2 PM, respectively; C22, C24, C25, C26, and C23 comprise four hour long possible shift candidates starting at 9 AM, 10 AM, 11 AM, 12 PM, and 1 PM, respectively; C27, C28, C29, and C30 comprise five hour long possible shift candidates starting at 9 AM, 10 AM, 11 AM, and 12 PM, respectively; C27, C28, C29, and C30 comprise five hour long possible shift candidates starting at 9 AM, 10 AM, 11 AM, and 12 PM, respectively; C31, C32, and C33 comprise six hour long possible shift candidates starting at 9 AM, 10 AM, and 11 AM, respectively; C34 and C35 comprise seven hour long possible shift candidates starting at 9 AM and 10 AM, respectively; and C36 comprises an eight hour long possible shift candidate starting at 9 AM. In some embodiments, each shift candidate as illustrated in 500 has multiple instances of identical start/end time and resource type up to the amount of the corresponding labor demand amount at the time. For example, shift candidate C1 starting at 9:00 am, ending at 10:00 am for a cashier can have up to two identical instances as the corresponding labor demand amount in 400 of FIG. 4 from 9:00 am to 10:00 am for cashier is two.

The set of shift candidates 500 must be at least able to cover all labor demand in 400 of FIG. 4, e.g., if every one of the shift candidates is assigned with a proper worker, the original labor demand will be more than sufficiently covered. In most cases, only a small subset of the shift candidates needs to be assigned a worker to fulfill the labor demand. For example, if only all one hour long shift candidates C1 through C8 are selected with all their corresponding identical replication instances, the labor demand in the example in 400 of FIG. 4 would be completely covered. The set of shift candidates 500 is normally filtered to remove shift candidates that do not conform to shift regulations (e.g., labor law, union contract, etc.). When a shift candidate is long enough to require a meal break or any other type of break, the meal break is properly inserted according the labor law. For example, if the labor law requires half hour meal break for any shift that is longer than six hours (e.g., shift candidates C31 through C36 in 500 and their corresponding replications with the same shift starting/ending time) would have a half hour meal break placed at the right time allowed by the law. When this happens, during the corresponding half hour meal break, the shift candidate does not provide any labor demand coverage expressed in 400 of FIG. 4. When the replication instances are generated with identical shift start/end time, the meal break is placed at different time slots (within the range allowed by the law) so that the replications can provide stronger labor demand coverage when used together. For example, the meal breaks may be placed for five replications of C36 from 11:30 am to 2:00 pm, one for every half hour. This way, the five replications of C36 can provide the complete coverage of 4 cashiers any time from 9:00 am to 5:00 pm expressed in 400 of FIG. 4. In some embodiments, the set of shift candidates 500 only contains a small subset of all possible shift candidates due to the filter conditions of being valid for labor law, union contract, and/or company policy and/or including variations of the shift candidates for breaks at different times within the shift candidates.

Normally a full enumeration of all the possible shift candidates for a given demand specification is not necessary to obtain high quality optimal schedule. Various heuristics can be used to generate shift candidates that are more likely to be used in the final schedule. Also, union rules or company policies may also limit the shift length to be within certain minimum and maximum durations. In some embodiments, a shift candidate may cover multiple labor demand types. For example, there may be a shift candidate from 9:00 am to 5:00 pm in which the first 3 hours is for a cashier role and the last 5 hours for a sales associate role. This type of shift candidate is generated when there is labor demand for multiple roles and there are workers who are qualified for multiple roles. The advantage of the system is that the shift candidate generation does not have to be perfect as long as it generates enough shift candidates (which is verifiable). It is the later optimization step that will select the right subset of the shift candidates to use in the final schedule so that all constraints (including the labor demand coverage constraints) are respected, and the total cost is minimized.

Figure 6:
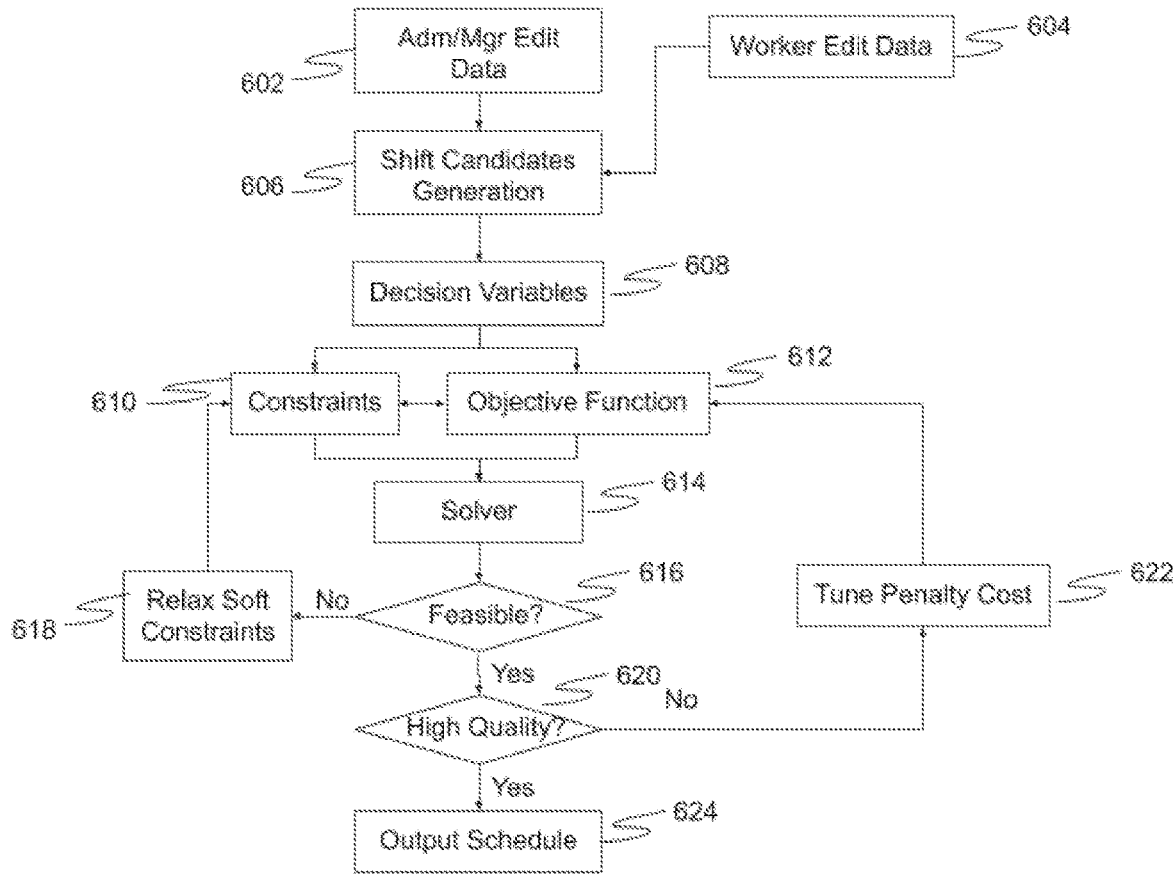
FIG. 6 is a flow diagram illustrating an embodiment of a process for schedule creation.

FIG. 6 is a flow diagram illustrating an embodiment of a process for schedule creation. In some embodiments, the process of FIG. 6 is executed by Scheduling Engine 106 of FIG. 1. In the example shown, in 602 almost all the scheduling input data illustrated in FIG. 3A-D (with the only exception of employee preference data) can be edited by an administrator or a manager. In 604, worker preference and availability data can be edited by individual workers. In 606, a set of shift candidates is generated as illustrated in FIG. 5. In 608, a set of decision variables are formed with the primary categories of decision variables being the shift candidate selection binary decision variables and the shift assignment binary decision variables. From there, control passes to 610 and 612 to build a set of constraints and an objective function respectively using the decision variables and the scheduling input data. Once the constraints and objective function are built, the solver 614 is invoked with the optimization model (e.g., the decision variables, the set of constraints and the objective function). The solver will try to find a solution that optimize the objective function (e.g., minimizing the total cost) while respecting all the given constraints. In 616, the system tests if the solver fails to find a solution, in the event that it is not feasible to find a solution, it will indicate that the given problem is infeasible, and control passes to 618 where certain soft constraints will be relaxed based on the order prescribed by the user (e.g., relax max hour per week constraints first before relaxing the demand coverage constraint). When a constraint is relaxed, it is removed from the set of constraints 610 and the corresponding constraint violation is added as a penalty cost term to the objective function 612. If in the test of 616 a feasible solution is found, the quality of the solution will be assessed in 620. This can be done either objectively by using the pre-configured criteria (e.g., at least 95% of the demand is covered and spending is within 2% of the given budget, etc.) or manually judged by the user through the examining of the resulting schedule. If the schedule quality is not good enough (e.g., only 40% of workers' preferences are respected), the control is passed to 622 to adjust the corresponding penalty cost weight of a particular term in the objective function and new objective function is formed in 612 (as will be illustrated in FIG. 9 later). In the event that the schedule quality is good, the final schedule is presented to the user in 624. For any practical scheduling problem, once certain number of constraints are relaxed (such as demand coverage constraint and minimum weekly hour constraints), a feasible solution is always found.

Figure 7:
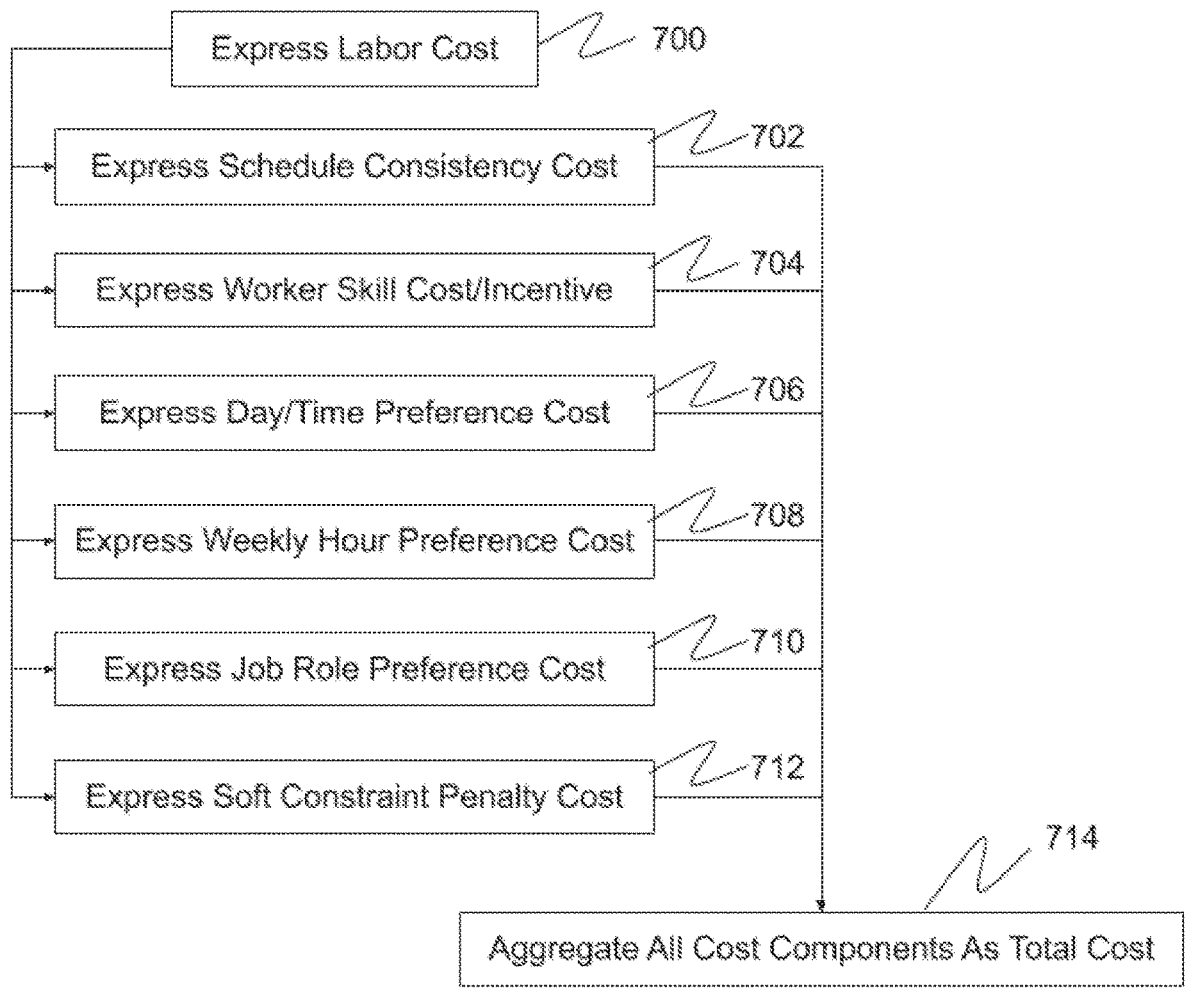
FIG. 7 is a flow diagram illustrating an embodiment of a process for expressing total schedule cost as a function of the decision variables and the scheduling input data.

FIG. 7 is a flow diagram illustrating an embodiment of a process for expressing total schedule cost as a function of the decision variables and the scheduling input data. In some embodiments, the process of FIG. 7 implements 612 of FIG. 6. In the example shown, in 700, the labor cost is expressed as a function of shift assignment decision $x_{i,j}$ and other input data. The system transforms the input data to generate the function enabling the use of an optimization calculation. For example, let T be all the days in a particular scheduling period under consideration, W be the set of all workers, S be the set of shift candidates generated, $q_D$, $q_W$ be the daily and weekly hour limit above which an overtime rate is incurred, $p_i$ be the normal hourly pay rate for worker i, $\theta$ be the overtime rate relative to the normal rate, $\alpha_j$ be the start time of shift j, $\beta_j$ be the end time of shift j, $b_j$ be an amount of unpaid break time during shift j, $g_{j,l}=1$ in the event that shift j is within day l, and $G_{j,L}=1$ in the event that shift j is within week L. Worker i on day l works $t_{i,l}=\Sigma_{j \in S} x_{i,j}(\beta_j - \alpha_j - b_j)g_{j,l}$ hours and is paid $t_{i,l} p_i$ in the event that $t_{i,l} \leq q_D$ or $t_{i,l} p_i + (t_{i,l} - q_D)(\theta - 1)p_i$ in the event that $t_{i,l} > q_D$. Utilizing a function max(0, y) defined as max(0, y)=y when y>0 and max(0, y)=0 when y≤0, the total pay for worker i would be $\Sigma_{l \in T}[t_{i,l} p_i +$ max(0, $t_{i,l}-q_D$)($\theta$-1)$p_i$] if the weekly overtime pay is not considered. Worker i in week L works $t_{i,L} = \Sigma_{j \in S} x_{i,j} (\beta_j - \alpha_j - b_j) G_{j,L}$ hours. For worker i the total overtime hours due to the weekly hour limit, without double counting with the daily limit, for week L will be max(0, $t_{i,L}-q_W-\Sigma_{l \in L}$ max($\theta$, $t_{i,l}-q_D$)). The labor cost for all workers for the entire scheduling period thus can be expressed as $C_1 = \Sigma_{i \in W} \{\Sigma_{l \in T} t_{i,l} p_i + [\Sigma_{l \in T}$ max($\theta$, $t_{i,l}-q_D$)+$\Sigma_{L \in T}$ max(0, $t_{i,L}-q_W-\Sigma_{l \in L}$ max(0, $t_{i,l}-q_D$))] ($\theta$-1)$p_i$}. If a particular shift has premium pay due to late night time of the shift, the proper premium rate will be used instead of the normal pay rate.

The labor cost in 700 contains nonlinear term in the form of expression like: max (0, x). By applying the technique described before, we can convert it into linear form by introducing additional supplemental decision variables and supplemental linear constraints. Other types of nonlinear terms, such as taking the absolute value, can be treated in similar manner. This way, the far more efficient MP solver can be used to solve the resulting optimization problem.

After the required real labor cost is expressed, many other penalty cost terms can be expressed if the user has configured the system to consider that particular component in the objective function. In 702, the schedule consistency cost is expressed as a penalty cost due to deviation from a worker's typical week. Let $x_{i,j}^t=1$ if worker i was assigned to shift j in his typical week and 0 otherwise. Let $c_{i,c}$ be a dollar amount that the system is willing to pay for one shift difference for worker i compared to his/her typical week. The following penalty (e.g., a consistency penalty) is added to the total cost due to schedule inconsistency $C_2 = \tau_{i \in W} \Sigma_{j \in S} c_{i,c} |x_{i,j} - x_{i,j}^t|$. This means that if a worker gets identical shift assignment as his/her typical week, there is no consistency penalty, otherwise, per shift difference penalty is incurred.

When multiple workers are qualified and available for a shift, if all other factors are equal the system would like to assign the shift to the worker with the best skill level match (e.g., a worker with skill of 9 out of 10 would get assigned over another worker with skill of 5 out 10 skill for that job). In 704, a worker below or above average skill cost/incentive is expressed. For example, let $c_{i,r}$ be the dollar amount incentive or penalty that the system is willing to pay for assigning worker i to a shift that requires role r, where $c_{i,r}=0$ in the event that the worker has the average skill proficiency for the role, $c_{i,r} \geq 0$ in the event that the worker has below average proficiency level, and $c_{i,r} \leq 0$ in the event that the worker has above average proficiency level. The cost (e.g., or incentive if a negative number) of assigning workers by skill proficiency is $C_3 = \Sigma_r \Sigma_{i \in W} \Sigma^{j \in S}_r c_{i,r} x_{i,j}$, where set $S_r$ is the set of shift candidates that need role r.

In 706, a worker day of the week and time of the day preference violation cost is expressed. For example, let $c_{i,T}$ be the dollar amount penalty that the system is willing to pay for violating a single timing preference for worker i and $\lambda_{i,j}=1$ in the event shift j respects worker i's preferences and 0 otherwise. The cost due to violating employee timing preferences is $C_4 = \Sigma_{i \in W} \Sigma_{j \in S} c_{i,T} (1-\lambda_{i,j}) x_{i,j}$.

In 708, a worker total weekly hours preference violation cost is expressed. For example, let $C_{i,H}$ be the dollar amount penalty that the system is willing to pay for each hour of violating a worker i's preferred number of hours per week preference, and $\sigma_i$ be the preferred number of hours each week for worker i. The total cost due to violating workers' target hour preferences is $C_5 = \Sigma_{i \in W} \Sigma_{L \in T} c_{i,H} |\sigma_i - \Sigma_{j \in L} x_{i,j} (\beta_j - \alpha_j - b_j)|$ In 710, a worker's job role preference violation cost is expressed. Let $\omega_{i,j}=1$ in the event shift j respects worker i's job role preference and 0 otherwise. Let $c_{i,P}$ be the dollar amount penalty that the system is willing to pay for each shift of violating worker i's job role preference. The total cost of violating workers' job role preferences is $C_6 = \Sigma_{i \in W} \Sigma_{j \in S} c_{i,P} (1-\omega_{i,j}) x_{i,j}$.

In 712, the penalty cost from relaxing some of the soft constraints is expressed. It is typically expressed as the difference between the left hand of the constraint and the right hand of the constraint multiplied by a unit violation penalty cost, such as the penalty for violating maximum weekly hours constraints: $c_i^H$ max (0, $\Sigma_j x_{i,j} (\beta_j - \alpha_j - b_j) - H_i$). It is referred to as $C_7$.

In 714, the objective function of the total schedule cost is expressed as the summation of the all the cost components of the FIG. 7, i.e., $C=C_1+C_2+C_3+C_4+C_5+C_6+C_7$.

Figure 8:
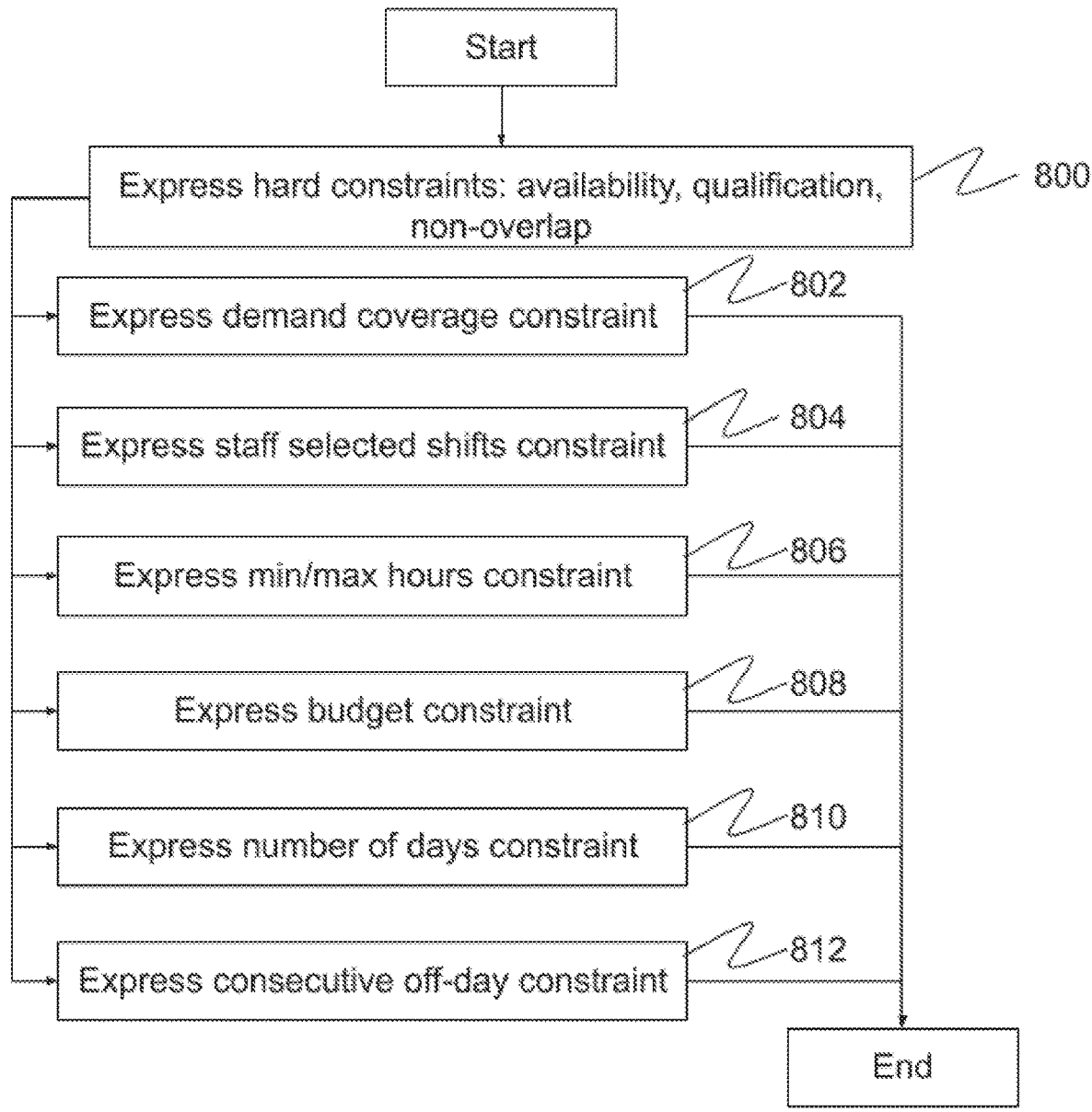
FIG. 8 is a flow diagram illustrating an embodiment of a process for expressing a set of constraints in the shift design and shift assignment problem.

FIG. 8 is a flow diagram illustrating an embodiment of a process for expressing a set of constraints in the shift design and shift assignment problem. In some embodiments, the process of FIG. 8 implements 610 of FIG. 6. In the example shown, in 800 the three categories of hard constraints that cannot be relaxed are expressed: the worker availability constraint, the worker qualification constraint and the non-overlap shift constraint. In any user configuration, the three categories of hard constraints will always exist (cannot be turned off) and cannot be relaxed. The system transforms the input data to generate the constraints enabling the use of an optimization calculation.

The worker availability constraint in 800 expresses that if a shift's duration is not fully contained in one of the available time slots for a worker, that worker cannot be assigned to that shift, e.g., if $(\alpha_j, \beta_j) \not\subset \{s_{i,k}, e_{i,k}\}$ for all $\Rightarrow x_{i,j}=0$, for all i$\in$W, j$\in$S, where $\alpha_j, \beta_j$ are the start/end time of shift j and $s_{i,k}, e_{i,k}$ are the start/end time of one of the kth availability slot for worker i.

The worker qualification constraints in 800 expresses that a worker is assigned to a shift only if the worker is qualified for the role required for the shift, e.g., if $r_j \notin R_i \Rightarrow x_{i,j}=0$ for all i$\in$W, j $\in$S, where $r_j$ is the role required by shift j and $R_i$ is the set of roles that the worker i is qualified for.

The shift non-overlap constraints in 800 express that when a worker is assigned to two shifts, the start time of the later shifts must be greater than the end time of the earlier shift by the amount of a required rest period $T_R$, e.g., if $(\alpha_j, \beta_j+T_R) \cap (\alpha_k, \beta_k) \neq \emptyset \Rightarrow x_{i,j}+x_{i,k} \leq 1$ for all i$\in$W and j, k$\in$S. In various embodiments, the shift non-overlap constraint can be used to model any one or more of: whether two or more shifts are allowed for a worker in the same day, a minimum break between two shifts for a worker, or any other appropriate constraint.

Other than the hard constraints, other constraints can be configured by the user as on or off. If a constraint is off, it means that the system does not need to consider it either as a constraint or in the objective function. For example, if there is no union contract or company policy that guarantees minimum number of hours per week, the minimum weekly hours constraint would be off. When a constraint is on, it can be further configured by the user as whether it is allowed to be relaxed or not. A constraint that is allowed to be relaxed can be moved to the objective function as a penalty term when no feasible solution is found.

In 802, the demand coverage constraints express that when adding up all the workers on the selected shift candidates used in the final schedule, it should supply the number of workers within the prescribed range for each role type r and each demand period l. Let $d_{r,l}$ and $D_{r,l}$ be the minimum and maximum number of workers working as role type r needed in demand period l, and $a_{j,r,l}=1$ in the event that shift j supply a worker of type r in demand period l, 0 otherwise.

The constraint is written as $d_{r,l} \leq \Sigma_j \ a_{j,r,l} y_j \leq D_{r,l} \forall r, l$. The demand coverage constraint is always required to be on and can be relaxed as needed. This constraint will force the proper subset of the shift candidates be selected so that the labor demand is covered.

Selecting the proper subset of the shift candidates to use the final schedule is not enough. The system also has to ensure that all selected shift candidates are properly staffed (assigned to worker). In 804, staffing all selected shift candidates with a worker is expressed as at least one worker should assigned to each selected shift candidate, i.e., $\Sigma_{i \in W} x_{i,j} \geq y_j$ for $j \in S$. This constraint combines the shift design/selection problem with shift assignment problem into a single optimization problem. This constraint of staffing all selected shift is required to be on and can be relaxed as needed.

In 806, worker minimum and maximum weekly hours constraints are expressed. Let $h_i$ and $H_i$ be the minimum and the maximum number of hours per week for worker i, and $b_j$ be the amount of unpaid break time during shift j. A worker minimum and maximum hours constraint can then be expressed as $h_i \leq \Sigma_{j \in L} x_{i,j} (\beta_j - \alpha_j - b_j) \leq H_i$ for all $i \in W$, $L \in T$. The min/max weekly hours constraints are optional (can be configured either on or off) and they can be relaxed as needed.

In 808, weekly budget constraint is expressed. From the previous labor cost expression, the budget constraint can be expressed as $C_l = \Sigma_{i \in W} \{\Sigma_{l \in T} \ t_{i,l} p_i + [\Sigma_{l \in T} \ \max(0, t_{i,l} - q_D) + \Sigma_{L \in T} \max(0, t_{i,L} - q_W - \Sigma_{l \in L} \max(0, t_{i,l} - q_D))](\theta - 1) p_i\} \leq B_L$ for all $L \in T$, wherein $B_L$ is the budget for week L. The budget constraints can also be expressed at the level lower than the entire schedule, such as at each job role level, or at the sub-organization level (such as departments within a store). The budget constraints are optional and can be relaxed as needed.

From time to time, an organization may guarantee their workers a certain number of days off per week or a certain number days with work per week. In 810, working a given number of days per week constraints are expressed. Let $W_F$ be the set of workers for whom the system enforces that the number of working days per week being within $[n_m, n_M]$. The constraint can be expressed as $n_m \leq \Sigma_{j \in L} x_{i,j} \leq n_M$ for all $i \in W_F$, $L \in T$. When $n_m = n_M = 5$, five working days a week for a typical full-time worker is achieved. The number of working days a week constraint is optional and can be relaxed.

Some companies guarantee their workers days off each week that are consecutive days. In 814, a number of consecutive days off constraints are expressed. Let binary variable $z_{i,l} = 1$ in the event that worker i gets day l and day l+1 of the week off. A two consecutive days off constraint can be expressed as $\Sigma_{l \in L} z_{i,l} = 1$ for all $i \in W_F$, $L \in T$ and $(\Sigma_{j \in S_l} x_{i,j} + \Sigma_{j \in S_l} x_{i,j}) \leq 2(1 - z_{i,j})$ for all $i \in W_F$, $l \in L \in T$, wherein $S_l$ is the set of shifts on day l (i.e., no shifts are assigned to the worker during his/her two-day off period). The two consecutive days off constraints are optional and can be relaxed.

The constraints in FIG. 8 are for illustration purpose. This system is not limited to the constraints mentioned in FIG. 8. With the two categories of main decision variables $x_{i,j}$, $y_j$ and potential other supplemental decision variables, the system can transform input data into almost any relevant constraints (e.g., any appropriate constraint for workforce scheduling).

Figure 9:
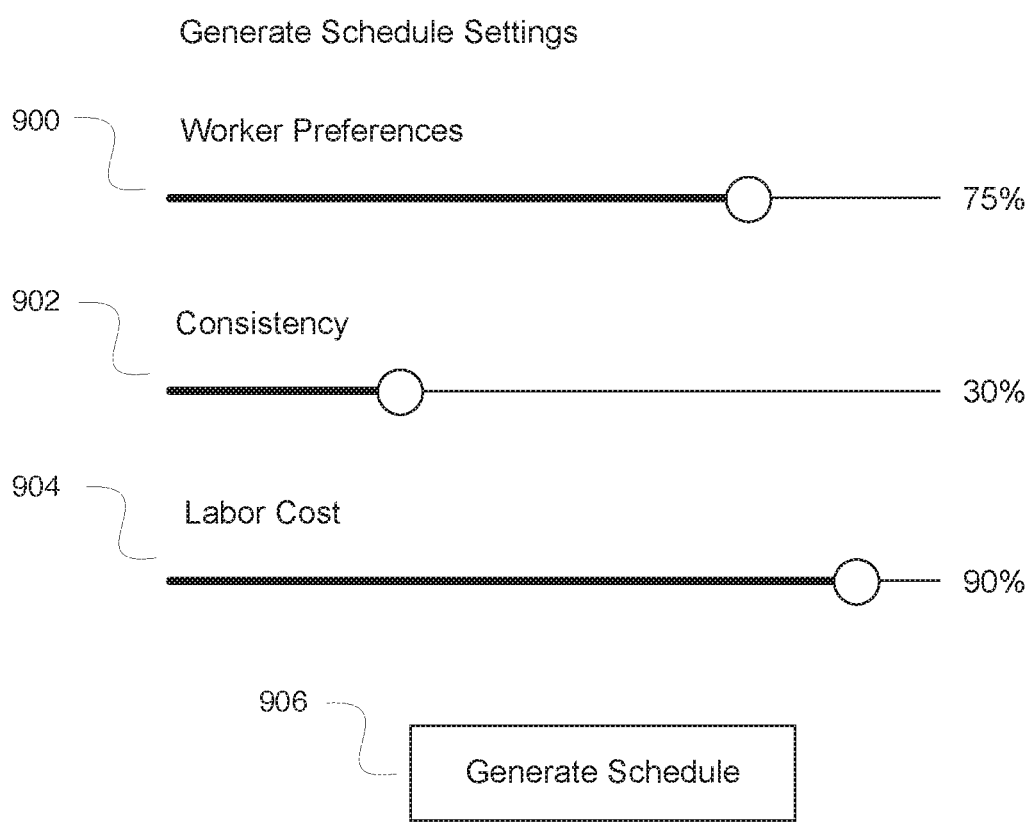
FIG. 9 is a diagram illustrating an embodiment of a user interface for adjusting relative importance of certain penalty cost terms in the objective function to achieve the desired schedule quality.

FIG. 9 is a diagram illustrating an embodiment of a user interface for adjusting relative importance of certain penalty cost terms in the objective function to achieve the desired schedule quality. In some embodiments, the interface of FIG. 9 is used to adjust relative importance of penalty cost terms as indicated in step 622 of FIG. 6. In the example shown, the objective function used by the solver to find an optimal solution may contain information along many dimensions in addition to the actual schedule cost. This way, the shape of the schedule can be influenced based on the relative importance of various considerations. For example, a penalty cost may be included if some of the employee's preferences are not respected, if the schedule is not consistent (same pattern) from one week to the next for employees, etc. In some embodiments, the user interface of FIG. 9 is interacted with using manager interface 204 of FIG. 2. In the example shown, the user interface uses slider bars to give each dimension of the objective function its proper weight of consideration when determining the optimal schedule. For example, worker preferences slide bar 900 indicates a weighting of worker preferences for scheduling generation of 75%; consistency slide bar 902 indicates a weighting of consistency for scheduling generation of 30%; and labor cost slide bar 904 indicates a weighting of labor cost for schedule generation of 90%. A user interface button of generate schedule 906 enables a user to indicate to generate a schedule. The weightings are used in the corresponding term of the objective function used by the solver during the process of determining the optimal or near optimal solution so that it makes the proper trade-off decision based on the given relative importance of each factors. Even though only three dimensions are used in FIG. 9 to illustrate the relative weighting adjustment, any penalty term that can appear in the objective function can be adjusted this way with a similar interface.

Figure 10:
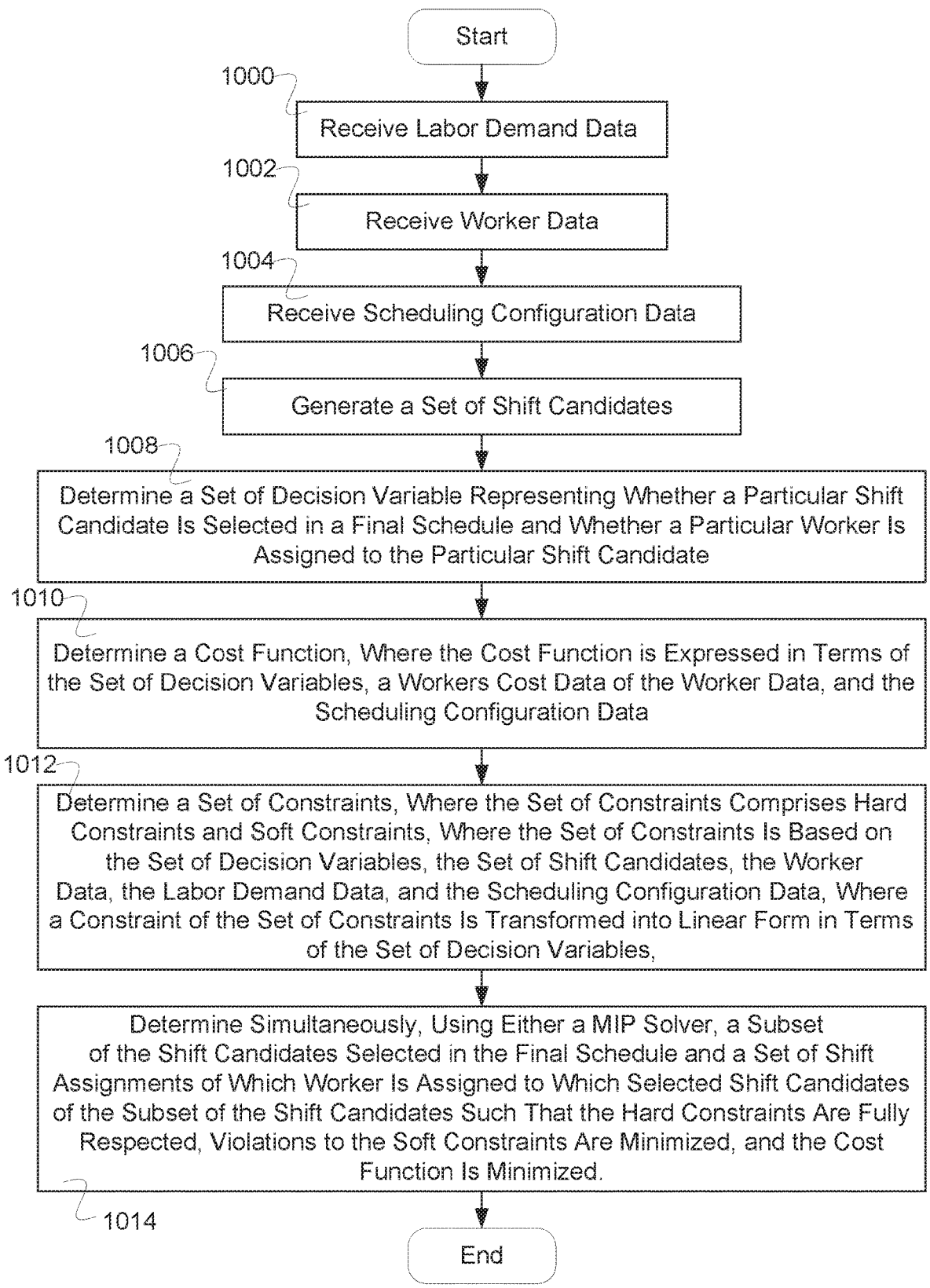
FIG. 10 is a flow diagram illustrating a process for shift design and shift assignment.

FIG. 10 is a flow diagram illustrating a process for shift design and shift assignment. In some embodiments, the process of FIG. 10 is executed using scheduling engine 106 of FIG. 1. In the example shown, in 1000 labor demand data is received. For example, labor demand data is received indicating workers needed—for example, how many workers are needed in hourly slots during a day. In various embodiments, the labor demand data includes a demand worker type, a number of workers needed, a demand start time and a demand end time, and/or any other appropriate labor demand parameter. In some embodiments, the labor demand data comprises a minimum number to a maximum number of required workers for a period of time. In 1002, worker data is received. For example, data related to workers is received. In various embodiments, the worker data includes worker availability data, worker qualification data, worker cost data, and/or any other appropriate data related to a worker. In 1004, scheduling configuration data is received. For example, configuration data related to scheduling is received. In various embodiments, the scheduling configuration data includes labor laws data, union contract data, company policy data, business condition data, penalty cost data, and/or any other appropriate data related to schedule configuration.

In 1006, a set of shift candidates is generated. For example, the set of shift candidates is generated based at least in part on labor demand, labor laws, union contract, and company policy. In various embodiments, the set of shift candidates comprise a full enumeration of all possible shifts, a set of more useful shifts (e.g., as generated using a predetermined set or using a heuristic), or any other appropriately determined set of shift candidates. In some embodiments, the set of shift candidate is generated using a heuristic. In some embodiments, the set of shift candidates are generated one at time through a heuristic wherein the heuristic can be either a full enumeration of all possible shifts covering at least part of the labor demand or a common sense heuristic to only produce the more useful shifts, and such each generated shift candidate can be evaluated, independent of the shift selection and shift assignment decisions, with respect to the conformance to the relevant labor law, union contract and company policy that govern single shift. In some embodiments, the heuristic generates shifts that include a meal break placed at a time point allowed by labor law when a shift duration is long enough to require a meal break. In some embodiments, the heuristic generates shifts in which one worker of the given role type(s) provides coverage for an entire shift duration except a meal break period when the meal break is part of that shift. In some embodiments, the heuristic generates shifts that are at least as long as a minimum length shift and no longer than a maximum length shift. In some embodiments, the heuristic generates shifts comprise up to all possible shifts for satisfying at least part of the labor demand. In some embodiments, a shift of the set of shift candidates is associated with a role or multiple roles for workers that are crossed trained to play multiple roles.

In 1008, a set of decision variables is determined representing whether a particular shift candidate is selected in a final schedule and whether a particular worker is assigned to the particular shift candidate. For example, the set of decision variables includes which subset of the shift candidates should be used in the final optimal schedule and which worker should be assigned to which shift. In some embodiments, for a worker i of the set of N workers and a shift candidate j of the set of M shift candidates, binary decision variable is defined as $y_j=1$ in the event that shift candidate j is selected in the final schedule and $y_j=0$ otherwise, and further the binary decision variable is defined as $x_{i,j}=1$ in the event that worker i is assigned to shift candidate j and $x_{i,j}=0$ otherwise.

In 1010, a cost function is determined, wherein the cost function is expressed at least in part on the set of decision variables, a worker cost data of the worker data, and the scheduling configuration data. For example, the cost function of the schedule comprises the real cost of paying the workers for the schedule and a soft penalty cost that measures the desirability of the schedule along many dimensions. In some embodiments, the real cost of the schedule comprises the sum of a normal pay cost (e.g., a cost related to the normal—for example, non-overtime and non-premium-time pay) and/or an overtime pay cost and other premium pay (e.g., shift hours at late night may be paid at higher than normal). In various embodiments, the soft penalty cost comprises, for example, a schedule consistency cost (e.g., a cost associated with assigning a worker an inconsistent week to week schedule), a worker below average skill proficiency cost (e.g., a cost associated with assigning a below average skilled worker to a shift), a worker day and time preference violation cost (e.g., a cost associated with assigning an employee to a shift outside of his/her days of the week or time of the day preferences), a worker weekly scheduled time preference violation cost (e.g., a cost associated with assigning a worker to a weekly scheduled time below or above of his/her weekly scheduled time preferences), a worker job role preference violation cost (e.g., a cost associated with assigning a worker to a shift associated with job role outside of his/her preferred role when the worker is qualified for multiple roles), and/or any other appropriate costs. In various embodiments, the cost function comprises one or more of the following: a real labor cost, a normal pay cost, an overtime pay cost, a premium time pay cost, a schedule consistency penalty cost, a worker skill level match cost, a worker timing preference cost, a worker preferred weekly total hours cost, a worker preferred role cost, a soft constraint violation penalty cost, and/or any other appropriate cost.

In some embodiments, the cost is generated as described in FIG. 7 above.

In 1012, a set of constraints is determined, wherein the set of constraints comprises hard constraints and soft constraints, wherein the set of constraints is based at least in part on the set of decision variables, the set of shift candidates, the worker data, the labor demand data, and the scheduling configuration data, wherein a constraint of the set of constraints is transformed into linear form in terms of the set of decision variables. For example, the set of constraints is expressed in terms of the decision variables and other known values (called parameter) of the given problem (e.g., a worker's hourly pay rate) in the form of a set of equalities or inequalities. For example, to ensure that a worker is only assigned to a shift for which he is qualified, the following constraint can be added to the solver: $x_{i,j}=0$ in the event worker i does not have the qualification needed for shift candidate j. To respect worker's availability, the following constraint can be added to the solver: $x_{i,j}=0$ in the event the entire duration of shift candidate j is not fully contained in at least one of the available time segments of worker i. To ensure that a worker i is not assigned to work in both shift j and shift k that overlap, the following constraint can be added to the solver: $x_{i,j}+x_{i,k} \leq 1$. In some embodiments, all relevant constraints in the shift design and shift assignment problem are determined in the form of a set equalities or inequalities in terms of the decision variables $x_{i,j}$ and $y_j$ and the input data. In various embodiments, the set of constraints comprises one or more of the following: a worker availability constraint, a worker qualification constraint, a shift non-overlap constraint, a demand coverage constraint, a staff selected shift constraint, a min/max weekly hours constraint, a budget constraint, a number of working days per week constraint, a consecutive rest days constraint, and/or any other appropriate constraint.

In some embodiments, the constraints are generated as described in FIG. 8 above.

In 1014, a subset of the shift candidates selected in the final schedule and a set of shift assignments of which worker is assigned to which selected shift candidate of the subset of the shift candidates are determined simultaneously, using either a MIP solver, such that the hard constraints are fully respected, violations to the soft constraints are minimized, and the cost function is minimized. In some embodiments, the subset of shift candidates is selected so that in every time period a number of required workers with appropriate qualifications is assigned. In various embodiments, the subset of the shift candidates and the set of shift assignments are determined to try to optimize an objective function, which can either minimize a total cost (e.g., a real cost plus a penalty cost) or maximize total profitability (e.g., a real profit plus an incentive measure including an employee happiness).

Figure 11:
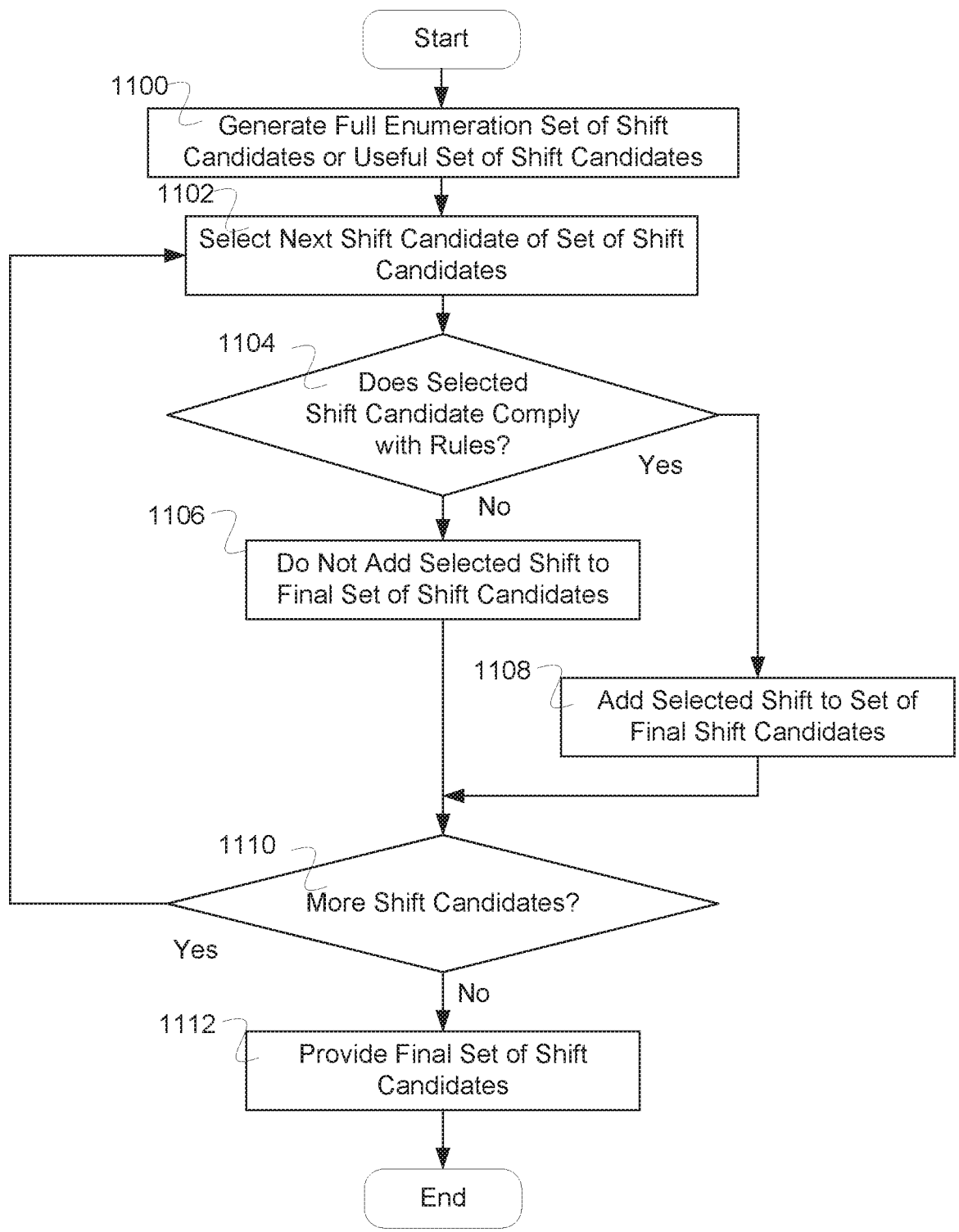
FIG. 11 is a flow diagram illustrating an embodiment of a process for generating a set of shift candidates.

FIG. 11 is a flow diagram illustrating an embodiment of a process for generating a set of shift candidates. In some embodiments, the process of FIG. 11 is used to implement 1006 of FIG. 10. In the example shown, in 1100 a full enumeration set of shift candidates or a set of useful shift candidates are generated. For example, a full set of shifts that span all possible shift lengths/start times in a day are generated, a full set of shifts that would satisfy the labor demand that span all possible shift lengths/start times in the labor demand are generated, a set of shifts that comprise practical shifts (e.g., longest shifts within labor demand, shifts in practical lengths—for example, full days, half days, etc.), or any other appropriate shifts. In 1102, a next shift candidate of the set of shift candidates is selected. For example, a first candidate or next one in the set is selected. In 1104, it is determined whether a selected shift candidate complies with the rules. For example, it is determined whether the shift candidate complies with labor laws, organization rules, union rules, etc. In 1106, in the event that the selected shift candidate does not comply with the rules, do not add selected shift to the final set of shift candidates, and control passes to 1110. In 1108, in the event that the selected shift candidate does comply with the rules, add selected shift to the final set of shift candidates, and control passes to 1110. In 1110, it is determined whether there are more shift candidates. For example, it is determined whether all the shift candidates have been evaluated for compliance with the rules. In the event that there are more shift candidates, control passes to 1102. In the event that there are no more shift candidates, control passes to 1112. In 1112, the final set of shift candidates is provided, and the process ends. For example, the final set of shift candidates is provided to the next step of processing.

Figure 12:
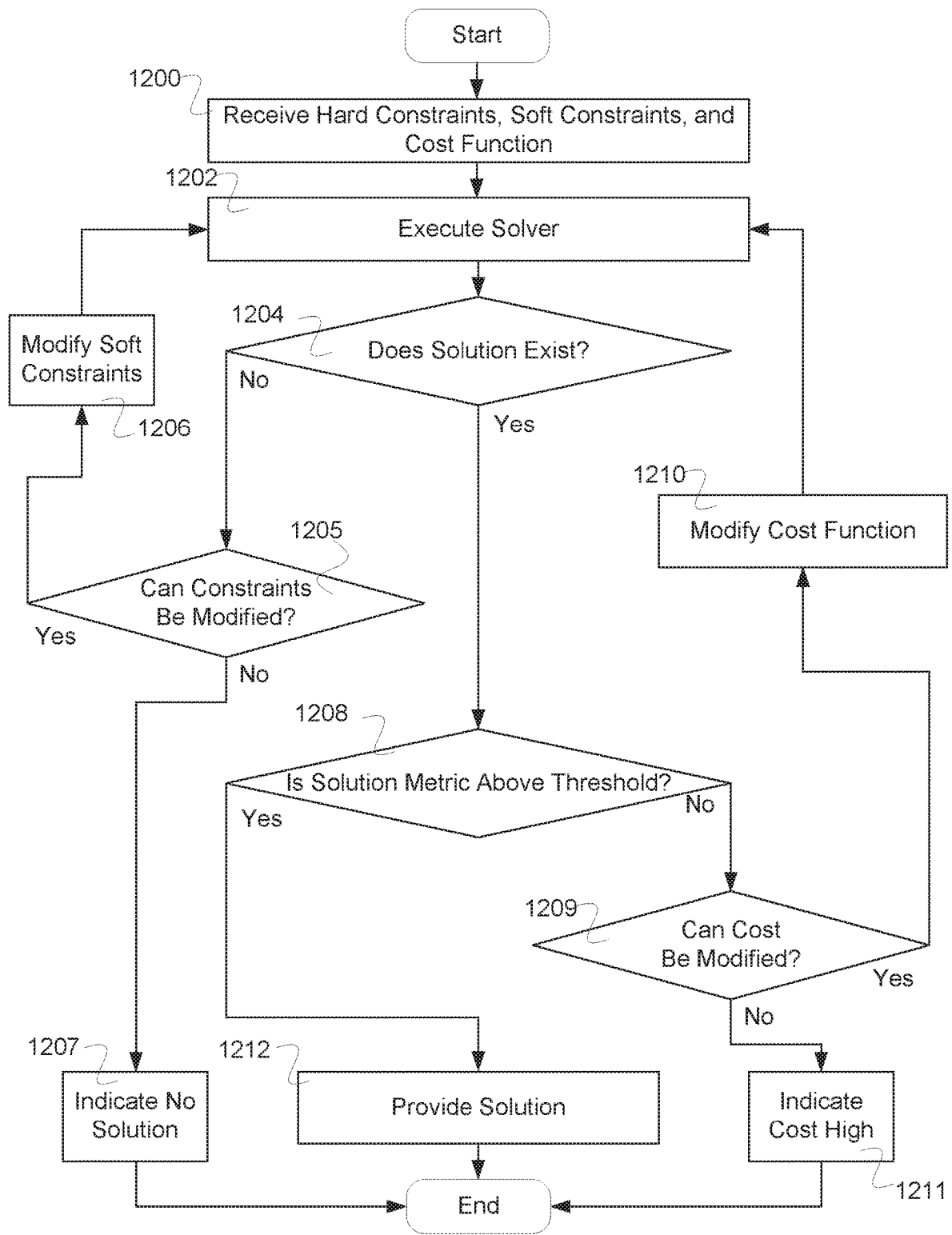
FIG. 12 is a flow diagram illustrating a process for determining a solution.

FIG. 12 is a flow diagram illustrating a process for determining a solution. In some embodiments, the process of FIG. 12 is used to implement 1014 of FIG. 10. In the example shown, in 1200 hard constraints, soft constraints, and a cost function are received. In 1202, the solver is executed. For example, using the hard constraints, soft constraints, and cost function that have been determined appropriately for a MIP solver, determine a solution, if any, and a solution metric associated with the solution. In 1204, it is determined whether the solution exists. In response to determining that no solution exists, control passes to 1205. In 1205, it is determined whether constraints can be modified. In response to determining that the constraints can be modified, control passes to 1206. In 1206, the soft constraints are modified and control passes to 1202. For example, the soft constraints are relaxed by removing from the constraint set and the constraint violation terms being added to the objective function and the solver is re-executed to determine a new solution. In response to determining that constraints cannot be modified, control passes to 1207. In 1207, it is indicated that there is no solution, and the process ends.

In response to determining that a solution exists in 1204, control passes to 1208. In 1208, it is determined whether the solution metric is above a threshold. For example, the solution metric is compared to a quality threshold to determine whether the closeness of the solution to the target cost is sufficient. In response to determining that the solution metric is not above the threshold, control passes to 1209. In 1209, it is determined whether cost can be modified. In response to determining that cost can be modified, control passes to 1210. In 1210, the cost function is modified, and control passes to 1202. For example, one or more penalty costs are modified within the overall cost function and the solver is re-executed to determine a new solution. In response to determining that cost cannot be modified, control passes to 1211. In 1211, in its indicated that cost is high, and the process ends.

In response to the solution metric being above the threshold in 1208, control passes to 1212. In 1212, the solution is provided, and the process ends. For example, the solution including a shift assignment and shift determination is provided.

Figure 13:
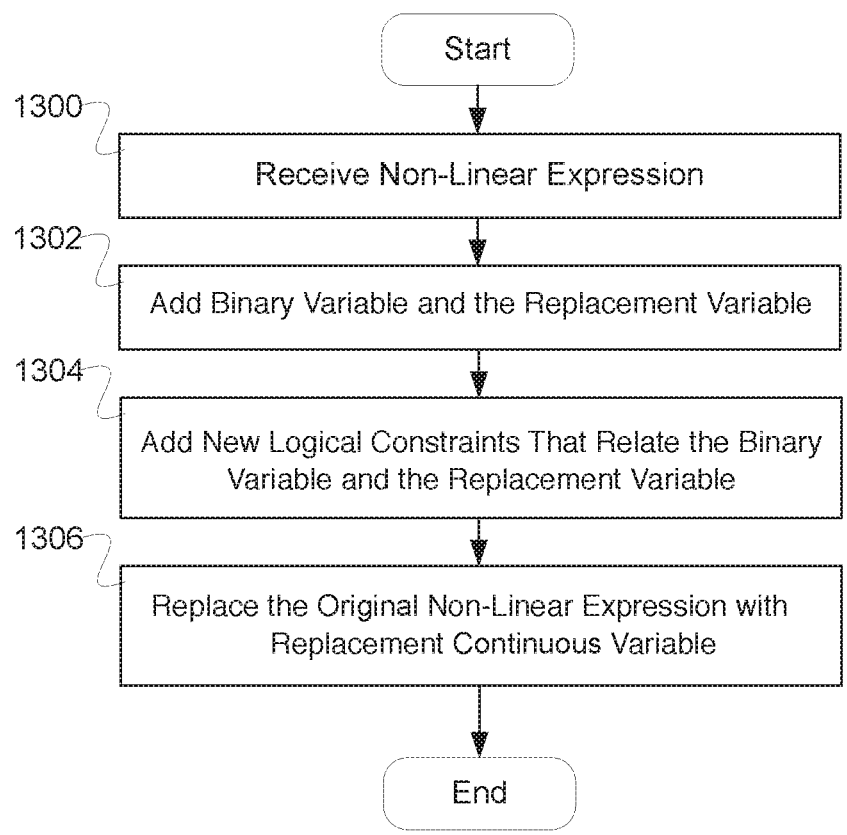
FIG. 13 is a flow diagram illustrating an embodiment of a process for converting a non-linear expression to a linear expression for the objective function or the constraints.

FIG. 13 is a flow diagram illustrating an embodiment of a process for converting a non-linear expression to a linear expression for the objective function or the constraints. In some embodiments, the process of FIG. 13 is used to implement 1008, 1010, and/or 1012 of FIG. 10 as appropriate. In the example shown, in 1300 a non-linear expression is received. For example, an expression such as max (0,x) is received for the objective function or a constraint. In 1302, a binary variable and a replacement variable are added. For example, for each expression like max(0,x), a binary variable u and new continuous replacement variable z are added. In 1304, a set of logical constraints that relate the binary variable and the replacement variable are added. For example, the following logical constraints are added:

$z \geq x$ $z \geq 0$ $z \leq x + Mu$ $z \leq M(1-u)$ where M is a positive value that is larger than absolute value of all possible x. In 1306, the original non-linear expression is replaced with the replacement continuous variable. For example, variable u is used replace the non-linear expression max(0,x) wherever it is used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for shift design and assignment, comprising:
   a user interface for adjusting a relative importance of one or more penalty cost terms, wherein each of the one or more penalty cost are associated with a corresponding constraint;
   one or more processors; and
   at least one non-transitory machine-readable storage media comprising instructions which, when executed by the one or more processors, cause the one or more processors to:
      receive, via the interface, an initial relative importance of the one or more penalty cost terms;
      generate a set of shift candidates based on labor demand data;
      determine a set of decision variables representing whether a particular shift candidate is selected in a final schedule and whether a particular worker is assigned to the particular shift candidate;
      determine a set of constraints based at least in part on the set of decision variables, the set of shift candidates, the labor demand data, the initial relative importance of the one or more penalty cost terms, and scheduling configuration data, wherein determining the set of constraints includes the one or more processors executing steps to:
         receive a nonlinear expression corresponding to a constraint of the set of constraints;
         determine a supplemental decision variable not included in the set of decision variables;
         convert the nonlinear expression into a set of one or more supplemental linear expressions, wherein at least one supplemental linear expression of the set of one or more linear expressions comprises the supplemental decision variable; and include the set of one or more supplemental linear expressions in the set of constraints;

determine simultaneously, using a Mixed Integer Programming (MIP) solver based at least in part on the set of constraints, a subset of the shift candidates selected in the final schedule and a set of shift assignments of which worker is assigned to which selected shift candidate of the subset of the shift candidates, wherein the determining includes the processor iteratively invoking the MIP solver to relax constraints based at least in part on attributes of the set of constraints and the initial relative importance of the one or more penalty cost terms corresponding to one or more constraints of the set of constraints;

receive, via the interface, an adjusted relative importance of the one or more penalty cost terms, wherein receiving the adjusted relative importance of the one or more penalty cost terms causes the processor to generate a redetermined set of constraints; and determine an adjusted final schedule and an adjusted set of shift assignments by the processor iteratively invoking the MIP solver to relax constraints based at least in part on the attributes of the set of constraints and the adjusted relative importance of the one or more penalty cost terms corresponding to the one or more constraints of the redetermined set of constraints.

2. The system of claim 1, wherein the set of constraints comprises at least one constraint expressed in terms of the set of decision variables.

3. The system of claim 1, wherein a cost function is expressed in terms of the set of decision variables.

4. The system of claim 1, wherein a cost function is transformed into linear form in terms of the set of decision variables.

5. The system of claim 1, wherein the set of constraints includes a worker availability constraint.

6. The system of claim 1, wherein the set of constraints includes a worker qualification constraint.

7. The system of claim 1, wherein the set of constraints includes a shift non-overlap constraint.

8. The system of claim 1, wherein the set of constraints includes a demand coverage constraint.

9. The system of claim 1, wherein the set of constraints includes a staff selected shift constraint.

10. The system of claim 1, wherein the set of constraints includes a min/max weekly hours constraint.

11. The system of claim 1, wherein the set of constraints includes a budget constraint.

12. The system of claim 1, wherein the set of constraints includes a number of working days per week constraint.

13. The system of claim 1, wherein the set of constraints includes a consecutive rest days constraint.

14. The system of claim 1, wherein a cost function includes a schedule consistency penalty cost.

15. The system of claim 1, wherein a cost function includes a worker skill level match cost.

16. The system of claim 1, wherein a cost function includes a worker timing preference cost.

17. The system of claim 1, wherein a cost function includes a worker preferred weekly total hours cost.

18. The system of claim 1, wherein a cost function includes a worker preferred role cost.

19. The system of claim 1, wherein a cost function includes a soft constraint violation penalty cost.

20. A method for shift design and assignment, comprising:

receiving, via a user interface for adjusting a relative importance of one or more penalty cost terms, an initial relative importance of the one or more penalty cost terms;

generating a set of shift candidates based on labor demand data;

determining, using a processor, a set of decision variables representing whether a particular shift candidate is selected in a final schedule and whether a particular worker is assigned to the particular shift candidate;

determining a set of constraints based at least in part on the set of decision variables, the set of shift candidates, the labor demand data, the initial relative importance of the one or more penalty cost terms, and scheduling configuration data, wherein determining the set of constraints includes the processor executing steps for:

receiving a nonlinear expression corresponding to a constraint of the set of constraints;

determining a supplemental decision variable not included in the set of decision variables;

converting the nonlinear expression into a set of one or more supplemental linear expressions, wherein at least one supplemental linear expression of the set of one or more linear expressions comprises the supplemental decision variable; and including the set of one or more supplemental linear expressions in the set of constraints;

determining simultaneously, using a Mixed Integer Programming (MIP) solver based at least in part on the set of constraints, a subset of the shift candidates selected in the final schedule and a set of shift assignments of which worker is assigned to which selected shift candidate of the subset of the shift candidates, wherein the determining includes the processor iteratively invoking the MIP solver to relax constraints based at least in part on attributes of the set of constraints and the initial relative importance of the one or more penalty cost terms corresponding to one or more constraints of the set of constraints;

receiving, via the interface, an adjusted relative importance of the one or more penalty cost terms, wherein receiving the adjusted relative importance of the one or more penalty cost terms causes the processor to generate a redetermined set of constraints; and determining an adjusted final schedule and an adjusted set of assignments by the processor iteratively invoking the MIP solver to relax constraints based at least in part on the attributes of the set of constraints and the adjusted relative importance of the one or more penalty cost terms corresponding to the one or more constraints of the redetermined set of constraints.

21. A computer program product for shift design and assignment, the computer program product being embodied in a non-transitory computer readable storage medium and comprising computer instructions for:

receiving, via a user interface for adjusting a relative importance of one or more penalty cost terms, an initial relative importance of the one or more penalty cost terms;

generating a set of shift candidates based on labor demand data;

determining, using a processor, a set of decision variables representing whether a particular shift candidate is selected in a final schedule and whether a particular worker is assigned to the particular shift candidate;

determining a set of constraints based at least in part on the set of decision variables, the set of shift candidates, the labor demand data, the initial relative importance of the one or more penalty cost terms, and scheduling configuration data, wherein determining the set of constraints includes the processor executing steps for:

receiving a nonlinear expression corresponding to a constraint of the set of constraints;

determining a supplemental decision variable not included in the set of decision variables;

converting the nonlinear expression into a set of one or more supplemental linear expressions, wherein at least one supplemental linear expression of the set of one or more linear expressions comprises the supplemental decision variable; and including the set of one or more supplemental linear expressions in the set of constraints;

determining simultaneously, using a Mixed Integer Programming (MIP) solver based at least in part on the set of constraints, a subset of the shift candidates selected in the final schedule and a set of shift assignments of which worker is assigned to which selected shift candidate of the subset of the shift candidates, wherein the determining includes the processor iteratively invoking the MIP solver to relax constraints based at least in part on attributes of the set of constraints and the initial relative importance of the one or more penalty cost terms corresponding to one or more constraints of the set of constraints;

receiving, via the interface, an adjusted relative importance of the one or more penalty cost terms, wherein receiving the adjusted relative importance of the one or more penalty cost terms causes the processor to generate a redetermined set of constraints; and determining an adjusted final schedule and an adjusted set of shift assignments by the processor iteratively invoking the MIP solver to relax constraints based at least in part on the attributes of the set of constraints and the adjusted relative importance of the one or more penalty cost terms corresponding to the one or more constraints of the redetermined set of constraints.

\* \* \* \* \*